United States Patent
Kaechi

(10) Patent No.: US 10,547,199 B2
(45) Date of Patent: Jan. 28, 2020

(54) COMMUNICATION APPARATUS AND CONTROL METHOD THEREOF

(71) Applicant: CANON KABUSHIKI KAISHA, Tokyo (JP)

(72) Inventor: Shuya Kaechi, Hashimoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 124 days.

(21) Appl. No.: 15/788,123

(22) Filed: Oct. 19, 2017

(65) Prior Publication Data

US 2018/0123378 A1 May 3, 2018

(30) Foreign Application Priority Data

Nov. 1, 2016 (JP) .................................. 2016-214640

(51) Int. Cl.
| | |
|---|---|
| *H02J 7/00* | (2006.01) |
| *H02J 7/02* | (2016.01) |
| *H02J 50/12* | (2016.01) |
| *H04W 84/10* | (2009.01) |

(52) U.S. Cl.
CPC .............. *H02J 7/025* (2013.01); *H02J 50/12* (2016.02); *H04W 84/10* (2013.01); *H02J 2007/0037* (2013.01)

(58) Field of Classification Search
CPC .... H02J 2007/0037; H02J 50/12; H02J 7/025; H02J 50/80; H02J 7/02; H02J 7/00; H04W 84/10
See application file for complete search history.

(56) References Cited

U.S. PATENT DOCUMENTS

| | | | |
|---|---|---|---|
| 7,840,206 B2 | 11/2010 | Kaechi | |
| 2014/0306650 A1 | 10/2014 | Akiyoshi et al. | |
| 2015/0028691 A1* | 1/2015 | Yamauchi | H02J 7/025 |
| | | | 307/104 |
| 2015/0188229 A1 | 7/2015 | Kaechi | |
| 2015/0222144 A1 | 8/2015 | Iwasaki et al. | |
| 2016/0079773 A1* | 3/2016 | Shinoda | H02J 5/005 |
| | | | 320/108 |

FOREIGN PATENT DOCUMENTS

| | | |
|---|---|---|
| JP | 2013-150534 A | 8/2013 |
| JP | 2014-082864 A | 5/2014 |

\* cited by examiner

*Primary Examiner* — Vuthe Siek
(74) *Attorney, Agent, or Firm* — Venable LLP

(57) ABSTRACT

A communication apparatus, comprises a power receiving unit configured to be capable of wirelessly receiving power from another apparatus, a charging unit configured to be capable of charging a secondary battery using the power received from the another apparatus, a wireless communication unit configured to be capable of performing wireless communication with the another apparatus, a rectification smoothing unit configured to rectify and smooth the power received from the another apparatus, and output the rectified and smoothed power, a suppressing unit configured to suppress a transient voltage fluctuation in an output voltage of the rectification smoothing unit, and a driving unit configured to drive the suppressing unit so that the output voltage of the rectification smoothing unit generated by the power received from the another apparatus does not exceed a first voltage.

15 Claims, 14 Drawing Sheets

FIG. 6A

| STATUS | |
|---|---|
| APPARATUS NAME | POWER RECEIVING APPARATUS ~201 |
| POWER RECEPTION CAPABILITY | CAPABLE |
| BATTERY VOLTAGE | 3.4V |
| CHARGE COMPLETION FLAG | UNCOMPLETED |
| CHARGE COMPLETION VOLTAGE | 4.2V |
| REMAINING BATTERY LEVEL | 40% |
| MAXIMUM RECEIVED POWER | 3.0W |
| POWER REQUESTED TO BE TRANSMITTED/RECEIVED | 2.8W |

FIG. 6B

| STATUS | |
|---|---|
| APPARATUS NAME | POWER RECEIVING APPARATUS ~201 |
| POWER RECEPTION CAPABILITY | INCAPABLE |
| BATTERY VOLTAGE | 3.4V |
| CHARGE COMPLETION FLAG | COMPLETED |
| CHARGE COMPLETION VOLTAGE | 4.2V |
| REMAINING BATTERY LEVEL | 40% |
| MAXIMUM RECEIVED POWER | 3.0W |
| POWER REQUESTED TO BE TRANSMITTED/RECEIVED | 2.8W |

FIG. 6C

| STATUS | |
|---|---|
| APPARATUS NAME | POWER RECEIVING APPARATUS ~201 |
| POWER RECEPTION CAPABILITY | INCAPABLE |
| BATTERY VOLTAGE | 3.4V |
| CHARGE COMPLETION FLAG | UNCOMPLETED |
| CHARGE COMPLETION VOLTAGE | 4.2V |
| REMAINING BATTERY LEVEL | 40% |
| MAXIMUM RECEIVED POWER | 3.0W |
| POWER REQUESTED TO BE TRANSMITTED/RECEIVED | 2.8W |

COMMUNICATION APPARATUS AND CONTROL METHOD THEREOF

BACKGROUND OF THE INVENTION

Field of the Invention

The present invention relates to a non-contact power supply system.

Description of the Related Art

In a non-contact power supply system, a battery inside an apparatus can be charged through wireless power supply without establishing wired connection with an external apparatus. In wireless power supply, power is transmitted and received in such a manner that an antenna of a power receiving apparatus receives electromagnetic waves emitted by an antenna of a power transmitting apparatus. In power transmission/reception between the power transmitting apparatus and the power receiving apparatus, power transmitted by the power transmitting apparatus is controlled in accordance with power required by the power receiving apparatus. There is a known phenomenon whereby, depending on the distance between and the positions of the antennas of the power transmitting apparatus and the power receiving apparatus, transmitted/received power practically changes while power is transmitted/received in accordance with power required by the power receiving apparatus.

Furthermore, in non-contact power supply, as wired connection is not established between the power transmitting apparatus and the power receiving apparatus, a so-called transient phenomenon, which is a voltage fluctuation, easily occurs in a circuit under the influence of a fluctuation in power transmitted/received between the power transmitting apparatus and the power receiving apparatus, displacement of the power transmitting apparatus and the power receiving apparatus, and the like. If the transient phenomenon causes application of voltage that exceeds an operating range of the circuit of the power receiving apparatus, the circuit may shut down due to its protection function, and an oscillation phenomenon whereby shutdown and activation of the circuit are repeated may occur. If the oscillation phenomenon has occurred, several problems arise, such as the extension of a charging period caused by the suspension of a charging operation, and irregular flashing of a charging display indicator which makes it difficult to grasp an operation state. In view of this, in non-contact power supply, control is performed to adjust power from the power transmitting apparatus in accordance with the states of charging current and loads in the power receiving apparatus. However, if the transient phenomenon has occurred due to a fluctuation in power transmitted/received between the power transmitting apparatus and the power receiving apparatus or due to displacement of the power transmitting apparatus and the power receiving apparatus, it is desirable to stabilize the circuit voltage in response to the transient phenomenon because, in some cases, making power adjustment cannot solve the transient phenomenon in time.

Japanese Patent Laid-Open No. 2013-150534 describes a technique to control power transmission so as to increase transmitted power when a power receiving apparatus including a secondary battery is activated during a charging period in which the secondary battery is charged based on transmitted power. Japanese Patent Laid-Open No. 2014-082864 describes a technique to transmit, to a power supply apparatus, power that is intended to be transmitted by the power supply apparatus in accordance with an amount of charging current in a power receiving apparatus based on a relationship between an amount of charging current to a secondary battery and a target value of rectification voltage.

Both Japanese Patent Laid-Open No. 2013-150534 and Japanese Patent Laid-Open No. 2014-082864 describe power supply control that transfers power required by a power receiving apparatus to a power transmitting apparatus, and adjusts power transmitted from the power transmitting apparatus based on the transfer result. However, neither Japanese Patent Laid-Open No. 2013-150534 nor Japanese Patent Laid-Open No. 2014-082864 considers the possibility of the occurrence of a transient phenomenon due to displacement and a fluctuation in transmitted/received power.

SUMMARY OF THE INVENTION

The present invention has been made in consideration of the aforementioned problems, and realizes a technique that can stabilize the input voltage of a power receiving apparatus by suppressing unstable operations of a circuit in which a transient phenomenon could possibly occur when the power receiving apparatus wirelessly receives power from another apparatus.

In order to solve the aforementioned problems, the present invention provides a communication apparatus, comprising: a power receiving unit configured to be capable of wirelessly receiving power from another apparatus; a charging unit configured to be capable of charging a secondary battery using the power received from the another apparatus; a wireless communication unit configured to be capable of performing wireless communication with the another apparatus; a rectification smoothing unit configured to rectify and smooth the power received from the another apparatus, and output the rectified and smoothed power; a suppressing unit configured to suppress a transient voltage fluctuation in an output voltage of the rectification smoothing unit; and a driving unit configured to drive the suppressing unit so that the output voltage of the rectification smoothing unit generated by the power received from the another apparatus does not exceed a first voltage.

In order to solve the aforementioned problems, the present invention provides a control method of a communication apparatus which has a power receiving unit configured to be capable of wirelessly receiving power from another apparatus, a charging unit configured to be capable of charging a secondary battery using the power received from the another apparatus, a wireless communication unit configured to be capable of performing wireless communication with the another apparatus, a rectification smoothing unit configured to rectify and smooth the power received from the another apparatus and output the rectified and smoothed power, a suppressing unit configured to suppress a transient voltage fluctuation in an output voltage of the rectification smoothing unit, and a driving unit configured to drive the suppressing unit so that the output voltage of the rectification smoothing unit generated by the power received from the another apparatus does not exceed a first voltage, the method comprising: until the output voltage of the rectification smoothing unit reaches a voltage that does not exceed the first voltage, gradually increasing charging current of the charging unit that is intended to charge the secondary battery using the power received from the another apparatus; and until the output voltage of the rectification smoothing unit falls within a range of a second voltage to a third voltage that are lower than the first voltage, further gradually increasing the charging current of the charging unit.

In order to solve the aforementioned problems, the present invention provides a computer-readable storage medium storing a program for causing a computer to execute a control method of a communication apparatus which has a power receiving unit configured to be capable of wirelessly receiving power from another apparatus, a charging unit configured to be capable of charging a secondary battery using the power received from the another apparatus, a wireless communication unit configured to be capable of performing wireless communication with the another apparatus, a rectification smoothing unit configured to rectify and smooth the power received from the another apparatus and output the rectified and smoothed power, a suppressing unit configured to suppress a transient voltage fluctuation in an output voltage of the rectification smoothing unit, and a driving unit configured to drive the suppressing unit so that the output voltage of the rectification smoothing unit generated by the power received from the another apparatus does not exceed a first voltage, the method comprising: until the output voltage of the rectification smoothing unit reaches a voltage that does not exceed the first voltage, gradually increasing charging current of the charging unit that is intended to charge the secondary battery using the power received from the another apparatus; and until the output voltage of the rectification smoothing unit falls within a range of a second voltage to a third voltage that are lower than the first voltage, further gradually increasing the charging current of the charging unit.

According to the present invention, the input voltage of a power receiving apparatus can be stabilized by suppressing unstable operations of a circuit in which a transient phenomenon could possibly occur when the power receiving apparatus wirelessly receives power from another apparatus.

Further features of the present invention will become apparent from the following description of exemplary embodiments (with reference to the attached drawings).

BRIEF DESCRIPTION OF THE DRAWINGS

FIGS. 6A to 6C show examples of status information that is communicated between the power transmitting apparatus and the power receiving apparatus at the time of wireless power supply according to the first embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

The following describes a non-contact power supply system including a power transmitting apparatus and a power receiving apparatus according to the present embodiment.

Figure 1:
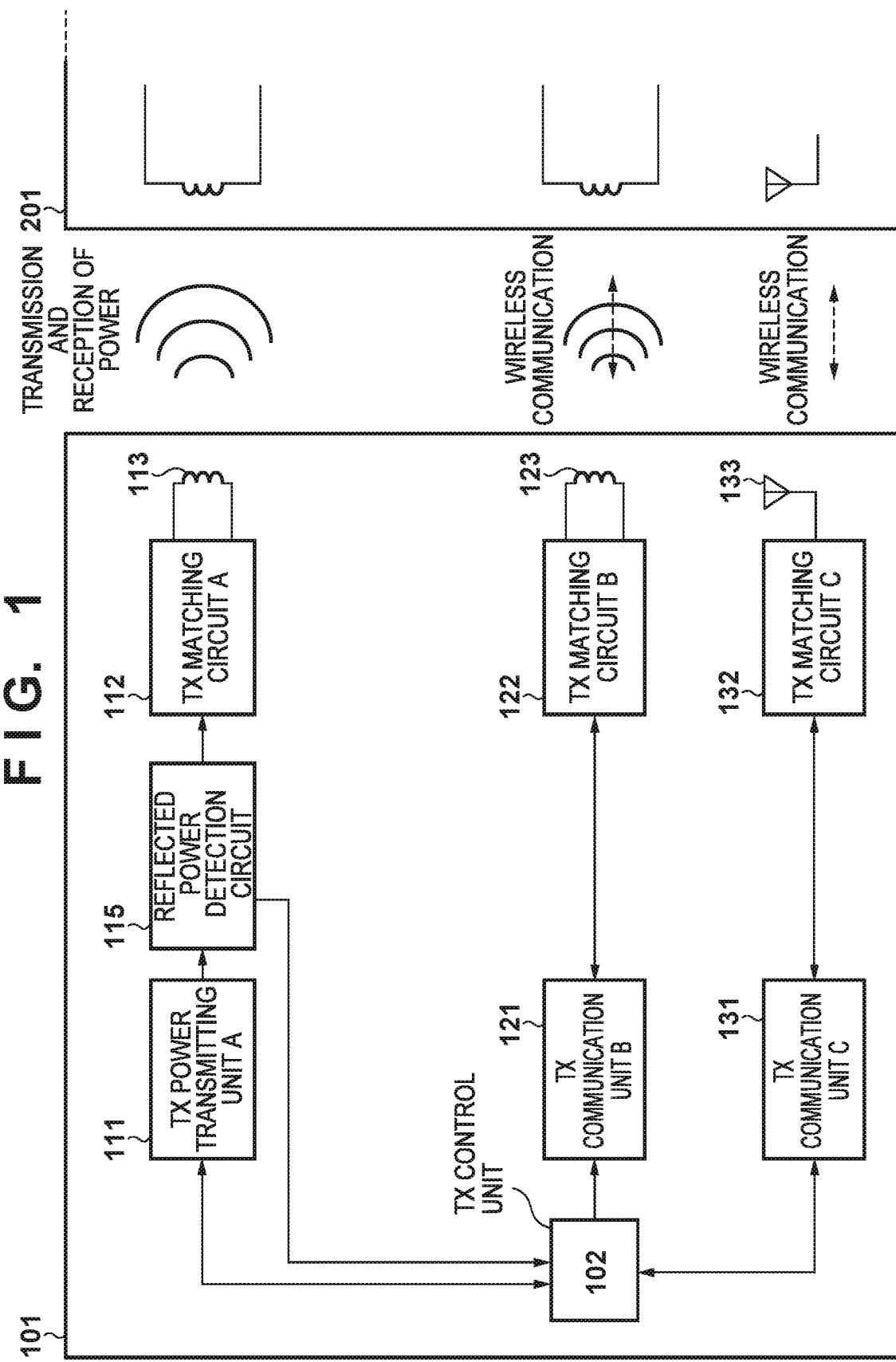
FIG. 1 is a block diagram showing an exemplary configuration of a power transmitting apparatus according to a first embodiment.
Figure 2:
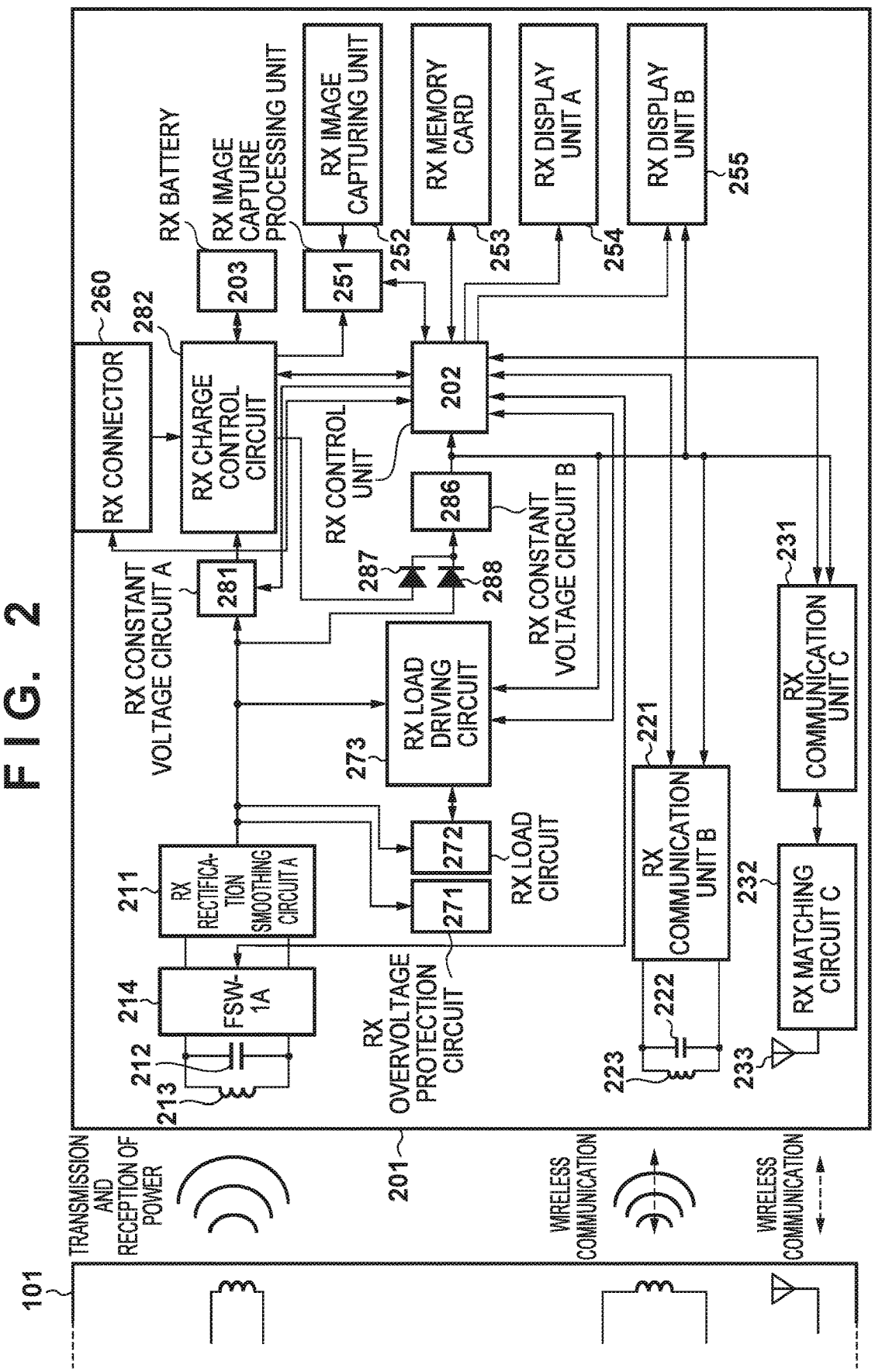
FIG. 2 is a block diagram showing an exemplary configuration of a power receiving apparatus according to the first embodiment.

FIG. 1 is a block diagram showing an exemplary configuration of the power transmitting apparatus according to the present embodiment. FIG. 2 is a block diagram showing an exemplary configuration of the power receiving apparatus according to the present embodiment.

The non-contact power supply system according to the present embodiment includes a power transmitting apparatus 101 and a power receiving apparatus 201 that communicates with the power transmitting apparatus 101 and receives power supplied thereto. When the power receiving apparatus 201 is present within a predetermined range, the power transmitting apparatus 101 receives a connection signal containing apparatus information from the power receiving apparatus 201 via non-contact communication. Upon determining that power can be supplied to the power receiving apparatus 201, the power transmitting apparatus 101 supplies power to the power receiving apparatus 201 by outputting power intended for power transmission via a power transmitting antenna. At this time, the power transmitting apparatus 101 can confirm the state of the power receiving apparatus 201 by receiving power reception information from the power receiving apparatus 201.

The power receiving apparatus 201 can receive power output from the power transmitting apparatus 101 via a power receiving antenna in the form of non-contact power reception. When the power receiving apparatus 201 is not present within the predetermined range of the power transmitting apparatus 101, the power receiving apparatus 201 cannot receive power from the power transmitting apparatus 101. The power receiving apparatus 201 can also transmit power reception information to the power transmitting apparatus 101 while receiving power.

The power receiving apparatus 201 can communicate with the power transmitting apparatus 101 when present within the predetermined range of the power transmitting apparatus 101. The power receiving apparatus 201 can also receive power from the power transmitting apparatus 101 when present within the predetermined range of the power transmitting apparatus 101.

It will be assumed that the power transmitting apparatus 101 can supply power to a plurality of electronic apparatuses in parallel in the form of non-contact power supply.

As long as the power receiving apparatus 201 is a communication apparatus that operates on power supplied from a secondary battery, it may be a tablet PC, a smartphone, an image capturing apparatus (e.g., a digital still camera or a digital video camera), or a playback apparatus that plays back audio data and image data. The power receiving apparatus 201 may be an automobile or another moving apparatus that is driven by power supplied from the secondary battery.

It will be assumed that the power receiving apparatus 201 can be an electronic apparatus that can operate on power supplied from the power transmitting apparatus 101 in the absence of the secondary battery.

In the first embodiment, wireless communication and wireless power transmission/reception are performed between the power transmitting apparatus 101 and the power receiving apparatus 201, and when the voltage of an output unit of a circuit that rectifies and smoothes wireless power in the power receiving apparatus 201 has increased or fluctuated, processing for stabilizing the voltage of the output unit is executed.

In the present embodiment, power transmitted by the power transmitting apparatus 101 is referred to as transmitted power, power received by the power receiving apparatus 201 is referred to as received power, and a rate of power received by the power receiving apparatus 201 to power transmitted by the power transmitting apparatus 101 is referred to as a power supply efficiency.

The configuration and functions of the power transmitting apparatus 101 according to the present embodiment will now be described using FIG. 1. In FIG. 1, the illustration of connection between a power source and the blocks that are not necessary for the description of the present embodiment is omitted. Furthermore, a specific description of the blocks and operations that are not necessary for the description of the present embodiment will be omitted below.

In FIG. 1, the power transmitting apparatus 101 can wirelessly transmit power to and wirelessly communicate with the power receiving apparatus 201. A TX control unit 102 includes, as built-in components, a CPU that controls an entirety of the power transmitting apparatus 101 including wireless power supply, a random-access memory (RAM) that is used as a working area, and a read-only memory (ROM) that stores processing procedures.

A TX power transmitting unit A 111 is comprised of circuits for wirelessly transmitting power to the power receiving apparatus, mainly a transistor amplification circuit, a crystal oscillation circuit, and so forth.

A TX matching circuit A 112 is intended to match the impedance of the TX power transmitting unit A 111 and the impedance of a later-described TX power transmitting antenna A 113 to each other. It will be assumed that the TX matching circuit A 112 can be adjusted under control of the TX control unit 102. Furthermore, the TX matching circuit A 112 includes a protection circuit that prevents the occurrence of excessive voltage during wireless power transmission.

The TX power transmitting antenna A 113 can wirelessly transmit power to the power receiving apparatus 201. It will be assumed that the TX power transmitting antenna A 113 has a resonant frequency of, for example, 6.78 MHz in the HF band.

A reflected power detection circuit 115 detects travelling waves and reflected waves of power output from the TX power transmitting antenna A 113 of the power transmitting apparatus 101 as a travelling wave voltage VF and a reflected wave voltage VR, respectively. The reflected power detection circuit 115 is, for example, a CM-type directional coupler. As the CM-type directional coupler is a commonly used circuit, a description thereof will be omitted.

A TX communication unit B 121 can perform near field wireless communication with another apparatus, and can communicate control data for performing wireless power supply to the power receiving apparatus 201. The TX communication unit B 121 may be, for example, a non-contact IC reader/writer that can read out data from a non-contact IC and write data into a non-contact IC. It will be assumed that near field wireless communication performed by the TX communication unit B 121 complies with ISO/IEC 21481, which is an international standard.

A TX communication matching circuit B 122 matches the impedance of the TX communication unit B 121 and the impedance of a later-described TX communication antenna B 123 to each other. The TX communication matching circuit B 122 may be a circuit that can be adjusted under control of the TX control unit 102, or may be a circuit with fixed constants. Furthermore, the TX communication matching circuit B 122 includes a protection circuit that prevents the occurrence of excessive voltage.

The TX communication antenna B 123 transmits and receives electromagnetic waves for performing near field wireless communication with another apparatus. The resonant frequency of the TX communication antenna B 123 is around, for example, 13.56 MHz in the HF band.

A TX communication unit C 131 can perform short-range wireless communication with another apparatus, and can communicate control data for performing wireless power supply to the power receiving apparatus. It will be assumed that short-range wireless communication performed by the TX communication unit C 131 complies with Bluetooth Low Energy®, which is a short-range wireless standard.

A TX communication matching circuit C 132 matches the impedance of the TX communication unit C 131 and the impedance of a later-described TX communication antenna C 133 to each other. The TX communication matching circuit C 132 may be a circuit that can be adjusted under control of the TX control unit 102, or may be a circuit with fixed constants. Furthermore, the TX communication matching circuit C 132 includes a protection circuit that prevents the occurrence of excessive voltage.

The TX communication antenna C 133 transmits and receives electromagnetic waves for performing short-range wireless communication with another apparatus. The resonant frequency of the TX communication antenna C 133 is around, for example, 2.45 GHz in the UHF band.

The configuration and functions of the power receiving apparatus 201 according to the present embodiment will now be described using FIG. 2. In FIG. 2, the illustration of connection between a power source and the blocks that are not necessary for the description of the present embodiment, as well as the illustration of input and output capacitors of these blocks, is omitted. Furthermore, a specific description of the blocks and operations that are not necessary for the description of the present embodiment will be omitted below.

In FIG. 2, the power receiving apparatus 201 can wirelessly receive power from and wirelessly communicate with the power transmitting apparatus 101.

An RX control unit 202 includes, as built-in components, a CPU that controls an entirety of the power receiving apparatus 201 including wireless power supply, a RAM that is used as a working area, and a ROM that stores later-described processing procedures.

An RX power receiving antenna A 213 can wirelessly receive power from the power transmitting apparatus. The resonant frequency of the RX power receiving antenna A 213 is around, for example, 6.78 MHz in the HF band.

A capacitor 212 constitutes an LC resonant circuit together with the RX power receiving antenna A 213, and decides on the antenna resonant frequency.

An antenna switch circuit FSW-1A 214 can turn ON and OFF the antenna functions of the RX power receiving antenna A 213 under control of the RX control unit 202. For example, the antenna switch circuit FSW-1A 214 may be a circuit serving as a shunt for the RX power receiving antenna A 213, or may be a circuit that cuts off connection between the RX power receiving antenna A 213 and circuits in subsequent stages.

An RX rectification smoothing circuit A 211 rectifies alternating-current (AC) voltage generated by power received from the power transmitting apparatus 101 into direct-current (DC) voltage. Once the rectification smoothing circuit A 211 has rectified the AC voltage into the DC voltage, an RX constant voltage circuit A 281 transforms the DC voltage into constant voltage and supplies the constant voltage to an RX charge control circuit 282 in a subsequent stage.

The RX charge control circuit 282 is a charge control circuit that can charge an RX battery 203. The RX charge control circuit 282 has not only a function of charging the RX battery 203, but also a function of outputting the voltage of the RX battery 203 to other circuits, for example, the RX control unit 202 and a later-described RX image capture processing unit 251. The RX battery 203 is, for example, a single-cell lithium-ion battery; however, it is not limited to this, and may be another type of chargeable secondary battery.

An RX constant voltage circuit B 286 transforms the rectified DC voltage from the rectification smoothing circuit A 211 into constant voltage, and supplies the constant voltage to the RX control unit 202, an RX communication unit B 221, an RX communication unit C 231, and an RX load driving circuit 273 in subsequent stages. The RX constant voltage circuit A 281 can supply current with which the RX battery 203 can be charged, and the RX constant voltage circuit B 286 may be comprised of a circuit that can supply a smaller amount of current than the RX constant voltage circuit A 281.

An operable voltage range of the RX constant voltage circuit B 286 is wider than an operable voltage range of the RX constant voltage circuit A 281, and the RX constant voltage circuit B 286 can operate on a higher or lower voltage than the RX constant voltage circuit A 281. For example, the operable voltage range of the RX constant voltage circuit B 286 is 3 V to 50 V, whereas the operable voltage range of the RX constant voltage circuit A 281 is 5 V to 32 V. An operable voltage range of the RX charge control circuit 282 is narrower than the operable voltage range of the RX constant voltage circuit A 281; for example, the operable voltage range of the RX charge control circuit 282 is 4 V to 7 V. Therefore, the output voltage of the RX constant voltage circuit A 281 can be set at, for example, 5.5 V.

It will be assumed that an absolute maximum rated voltage range of the RX constant voltage circuit B 286 is wider than an absolute maximum rated voltage range of the RX constant voltage circuit A 281, and the RX constant voltage circuit B 286 can operate within a rated range at a higher or lower voltage than the RX constant voltage circuit A 281. For example, the absolute maximum rated voltage of the RX constant voltage circuit B 286 is −0.3 V to 60 V, whereas the absolute maximum rated voltage of the RX constant voltage circuit A 281 is −0.3 V to 40 V. An absolute maximum rated voltage range of the aforementioned RX charge control circuit 282 is narrower than the absolute maximum rated voltage range of the RX constant voltage circuit A 281; for example, the absolute maximum rated voltage of the RX charge control circuit 282 is −0.3 V to 30 V.

In the present embodiment, an upper limit of the absolute maximum rated voltage of the RX constant voltage circuit A 281 is expressed as VAMRA, a lower limit of the operable voltage of the RX constant voltage circuit A 281 is expressed as VLA, and an upper limit of the operable voltage of the RX constant voltage circuit A 281 is expressed as VHA. A lower limit of the operable voltage of the RX constant voltage circuit B 286 is expressed as VLB.

The RX constant voltage circuit B 286 is OR-connected to diodes 287 and 288 so that it can receive current from both the RX rectification smoothing circuit A 211 and the RX charge control circuit 282.

The OR-connection to the diodes 287 and 288 enables the RX control unit 202, RX communication unit B 221, RX communication unit C 231, and RX load driving circuit 273 to operate on either power received via the RX power receiving antenna A 213 or power from the RX battery 203.

The output of the RX constant voltage circuit B 286 is connected to the RX control unit 202, the RX communication unit B 221, the RX communication unit C 231, and an RX display unit B 255. For example, assume a case in which wireless power received via the RX power receiving antenna A 213 has decreased and fallen below VLA, which is the lower limit of the operable voltage of the RX constant voltage circuit A 281, thereby suspending output operations of the RX constant voltage circuit A 281 and the RX charge control circuit 282 and suspending a charging operation of the RX battery 203. In this case, setting a low voltage as VLB, which is the lower limit of the operable voltage of the RX constant voltage circuit B 286, prevents suspension of the operations of the RX control unit 202, RX communication unit B 221, RX communication unit C 231, and RX display unit B 255.

With this configuration, a reduction in wireless power received via the RX power receiving antenna A 213 is not likely to suspend a sequence executed by the RX control unit 202, wireless communication by the RX communication unit B 221 and the RX communication unit C 231, and display on the RX display unit B 255 in the power receiving apparatus 201.

Therefore, the present embodiment can prevent irregular flashing of a charging display indicator, thereby preventing a burden associated with confusion on an operation state.

An RX overvoltage protection circuit 271 is disposed at an output portion of the RX rectification smoothing circuit A 211 and in a preceding stage of an RX load circuit 272. The RX overvoltage protection circuit 271 is configured to have a voltage lower than the absolute maximum rated voltage of an input portion of the RX constant voltage circuit A 281, and may be comprised of a constant voltage diode, for example.

The RX load circuit 272 is intended to control the input voltage of the RX constant voltage circuit A 281 to fall within the corresponding operable range, and is comprised of a resistor and a transistor, for example.

The RX load driving circuit 273 drives the RX load circuit 272, which is intended to control the input voltage of the RX constant voltage circuit A 281 to fall within the corresponding operable range. Exemplary configurations of the RX load circuit 272 and the RX load driving circuit 273 will be described later.

An RX communication antenna B 223 can perform near field wireless communication with another apparatus, and can communicate control data for performing wireless power supply to the power transmitting apparatus 101. The resonant frequency of the RX communication antenna B 223 is around, for example, 13.56 MHz in the HF band.

A capacitor 222 constitutes an LC resonant circuit together with the RX communication antenna B 223, and decides on the antenna resonant frequency.

The RX communication unit B 221 can perform near field wireless communication with another apparatus, and can communicate control data for performing wireless power supply to the power transmitting apparatus. The RX communication unit B 221 may be, for example, a non-contact IC that allows a non-contact IC reader to read out data therefrom and write data thereto. It will be assumed that near field wireless communication performed by the RX communication unit B 221 complies with ISO/IEC 21481, which is an international standard.

The RX communication unit C 231 can perform short-range wireless communication with another apparatus, and can communicate control data for performing wireless power supply to the power receiving apparatus. It will be assumed that short-range wireless communication performed by the RX communication unit C 231 complies with Bluetooth Low Energy®, which is a short-range wireless standard.

An RX communication matching circuit C 232 is intended to match the impedance of the RX communication unit C 231 and the impedance of a later-described RX communication antenna C 233 to each other. The RX communication matching circuit C 232 may be a circuit that can be adjusted under control of the RX control unit 202, or may be a circuit with fixed constants. Furthermore, the RX communication matching circuit C 232 includes a protection circuit that prevents the occurrence of excessive voltage.

The RX communication antenna C 233 transmits and receives electromagnetic waves for performing short-range wireless communication with another apparatus. The resonant frequency of the RX communication antenna C 233 is around, for example, 2.45 GHz in the UHF band.

The RX image capture processing unit 251 converts an image shot by an RX image capturing unit 252, which is comprised of an optical unit including lenses and a lens driving system and an image sensor, into digital data.

Digital data of an image processed by the RX image capture processing unit 251 can be written to and read out from an RX memory card 253. The RX memory card 253 is, for example, a rewritable nonvolatile memory, such as a flash memory.

An RX display unit A 254, which is a liquid crystal display (LCD) for example, can display operation information of the power receiving apparatus 201 and an image shot by the RX image capturing unit 252.

The RX display unit B 255, which is a light emitting diode (LED) for example, serves as an indicator that shows a processing state of the power receiving apparatus 201.

An RX connector 260 is a connector for an external interface, and the power receiving apparatus 201 can connect to another apparatus via the connector 260. Furthermore, power can be supplied from another apparatus connected via the RX connector 260 to charge the RX battery 203 via the RX charge control circuit 282.

Figure 3:
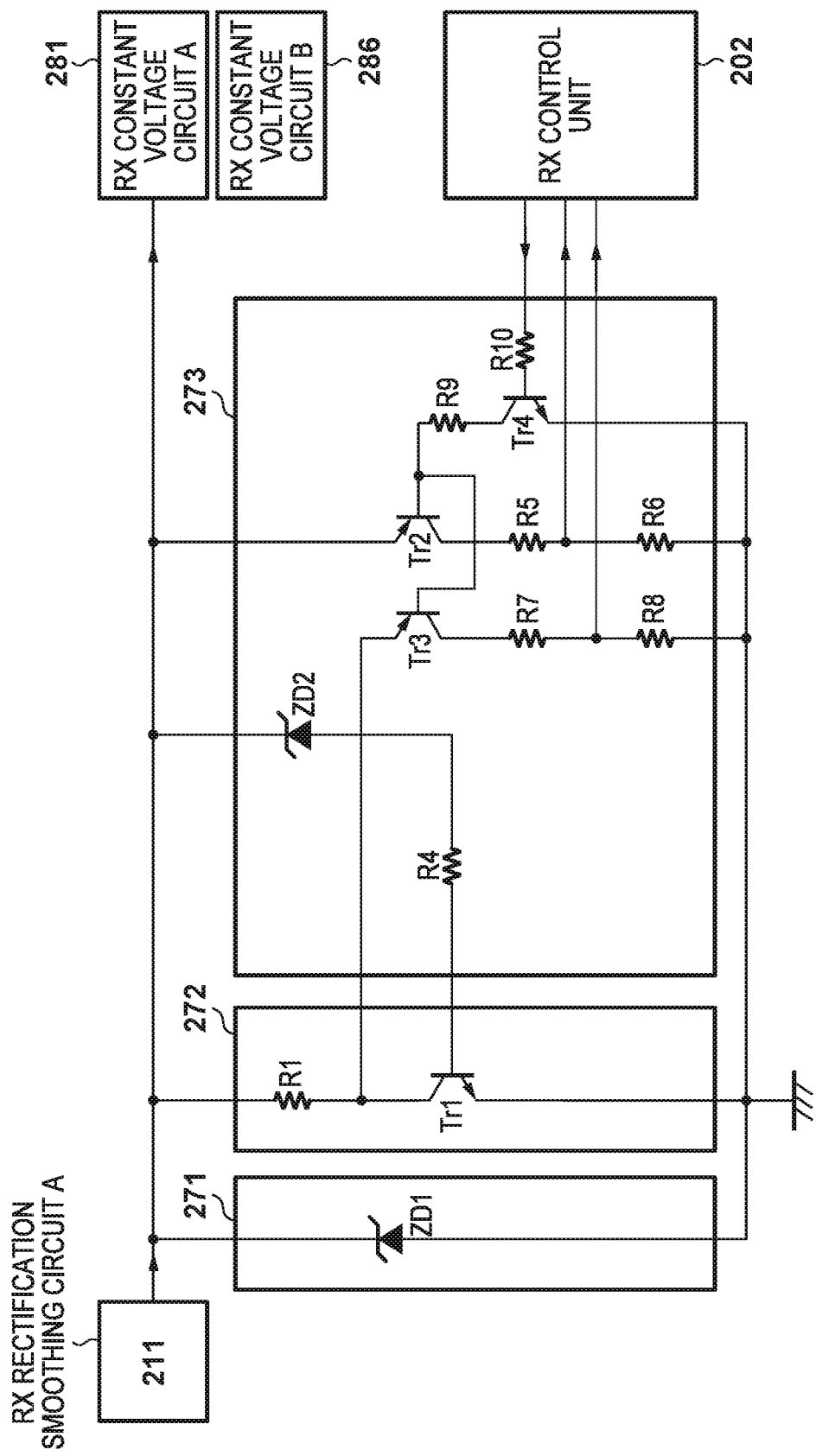
FIG. 3 shows exemplary configurations of an overvoltage protection circuit, a load circuit, and a load driving circuit of the power receiving apparatus according to the first embodiment.

Using FIG. 3, the following describes circuit configurations of the RX overvoltage protection circuit 271, RX load circuit 272, and RX load driving circuit 273 in the power receiving apparatus 210. In FIG. 3, the illustration of a bypass capacitor that is not necessary for the description of the present embodiment is omitted. Furthermore, a specific description of the blocks and operations that are not necessary for the description of the present embodiment will be omitted.

In FIG. 3, the RX overvoltage protection circuit 271 is comprised of a constant voltage diode ZD1. The RX load circuit 272 is comprised of a transistor Tr1 and a resistor R1 that is connected to the collector side of the transistor Tr1. The RX load driving circuit 273 is comprised of a constant voltage diode ZD2, resistors R4, R5, R6, R7, R8, R9, and R10, and transistors Tr2, Tr3, and Tr4.

Upon wireless reception of power via the RX power receiving antenna A 213, the RX rectification smoothing circuit A 211 outputs DC voltage.

When the voltage of the output portion of the RX rectification smoothing circuit A 211 has exceeded the breakdown voltage of the constant voltage diode ZD2, the diode ZD2 starts operating and drives the transistor Tr1 of the RX load circuit 272.

When driven, the transistor Tr1 of the RX load circuit 272 causes current to flow from the output portion of the RX rectification smoothing circuit A 211 to the ground via the resistor R1.

Along with this flow of current in the driven RX load circuit 272, the voltage of the output portion of the RX rectification smoothing circuit A 211 decreases and falls below the breakdown voltage of the constant voltage diode ZD2, thereby suspending the driving of the transistor Tr1 of the RX load circuit 272.

As described above, the RX load circuit 272 and the RX load driving circuit 273 operate in accordance with the breakdown voltage of the constant voltage diode ZD2; this can suppress and stabilize a transient voltage increase of the output portion of the RX rectification smoothing circuit A 211.

It is sufficient to set a voltage that actuates the RX overvoltage protection circuit 271 to be lower than the absolute maximum rated voltage of the RX constant voltage circuit A 281. For example, when the absolute maximum rated voltage of the RX constant voltage circuit A 281 is 40 V, it is sufficient to set a protection voltage that actuates the RX overvoltage protection circuit 271 at approximately 36 V.

In the present embodiment, the protection voltage of the RX overvoltage protection circuit 271 is expressed as VZ1.

It is sufficient to set a voltage that actuates the RX load driving circuit 273 and the RX load circuit 272 so that it does not exceed the upper limit of the operating voltage of the RX constant voltage circuit A 281. For example, when the upper limit of the operating voltage of the RX constant voltage circuit A 281 is 32 V, it is sufficient to set the voltage that actuates the RX load driving circuit 273 and the RX load circuit 272 at approximately 28 V. In the present embodiment, the voltage that actuates the RX load circuit 272 is expressed as a first set voltage VLD1.

The current of the RX load circuit 272 and the voltage of the output portion of the RX rectification smoothing circuit A 211 can be measured as values of voltages that have been divided using resistors by driving Tr4, Tr2, and Tr3 of the RX load driving circuit 273 in accordance with a control signal from the RX control unit 202.

<Processing Procedures>

The following describes wireless power supply processing of the power transmitting apparatus 101 and the power receiving apparatus 201 according to the present embodiment, using FIGS. 4A to 6C in addition to FIGS. 1 to 3 described above.

Figure 4A:
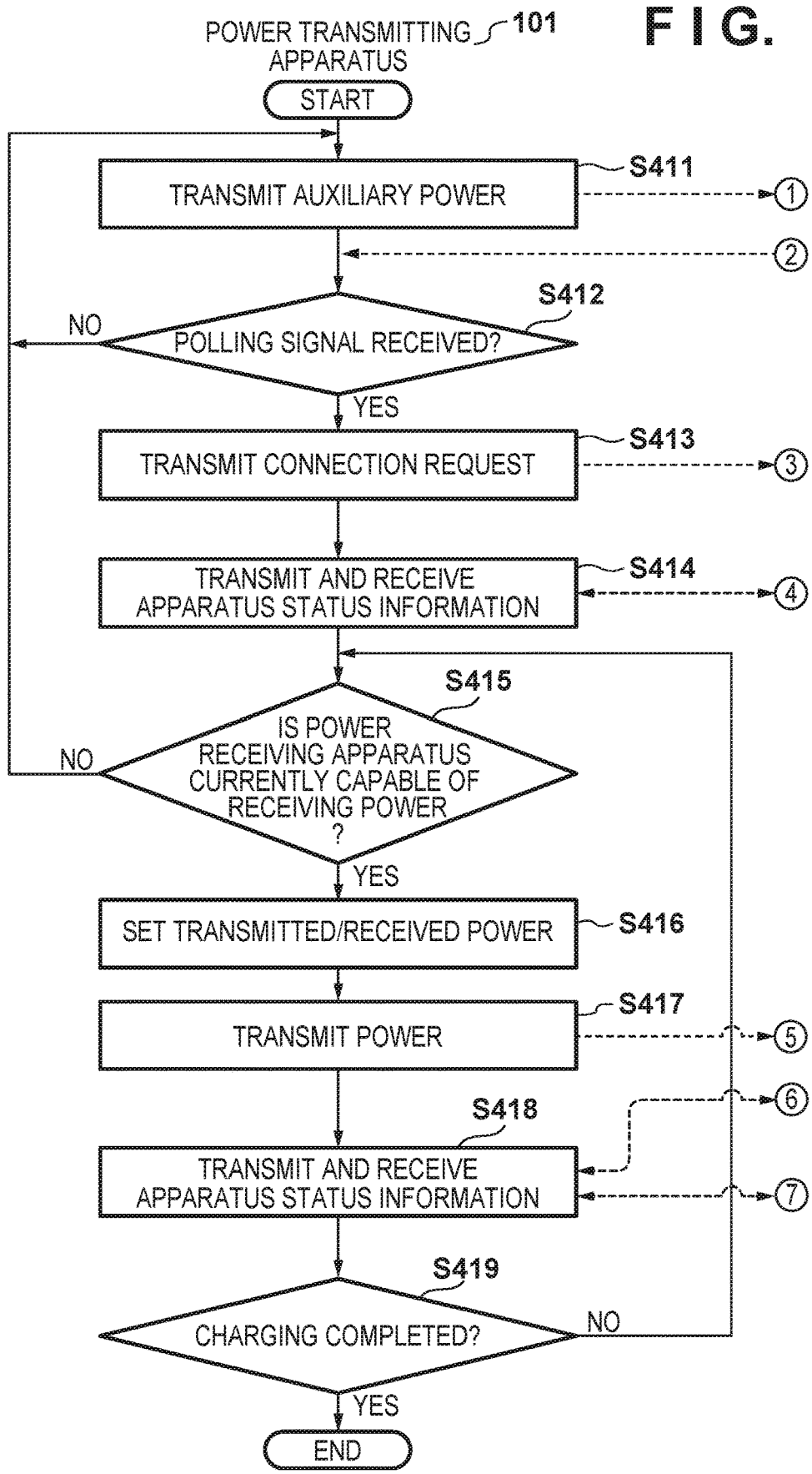
FIGS. 4A and 4B are flowcharts showing a procedure of wireless power supply between the power transmitting apparatus and the power receiving apparatus according to the first embodiment.
Figure 4B:
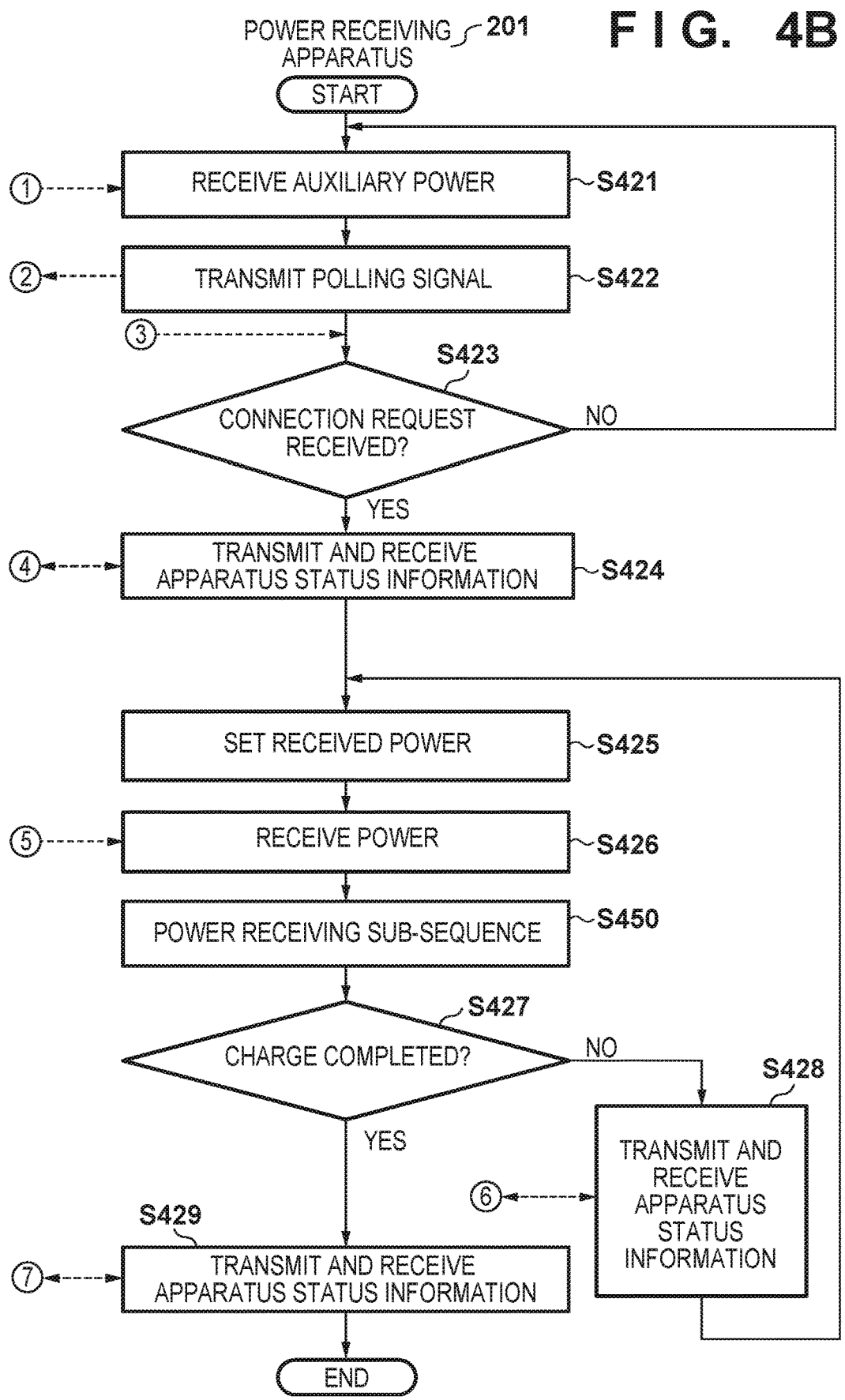

FIGS. 4A and 4B show procedures of processing of the power transmitting apparatus 101 and the power receiving apparatus 201 in wireless power supply. It will be assumed that the following processing is executed by the TX control unit 102 of the power transmitting apparatus 101 or the RX control unit 202 of the power receiving apparatus 201, unless otherwise stated specifically. The same goes for later-described FIG. 5. In the flowcharts of FIGS. 4A and 4B, transmission and reception of information necessary for wireless power supply are performed by the TX communication unit C 131 of the power transmitting apparatus 101 and the RX communication unit C 231 of the power receiving apparatus 201, respectively, unless otherwise stated specifically.

FIGS. 6A to 6C show exemplary structures of apparatus status information that is transmitted and received between the power transmitting apparatus 101 and the power receiving apparatus 201 during the wireless power supply processing shown in the flowcharts of FIGS. 4A and 4B. Apparatus status information contains, for example, the following information as shown in FIGS. 6A to 6C: "apparatus name," "power reception capability," "battery voltage," "charge completion flag," "charge completion voltage," "remaining battery level," "maximum received power," and "power requested to be transmitted/received." It will be assumed that apparatus status information is stored in the TX control unit 102 of the power transmitting apparatus 101 and the RX control unit 202 of the power receiving apparatus 201.

Figure 7A:
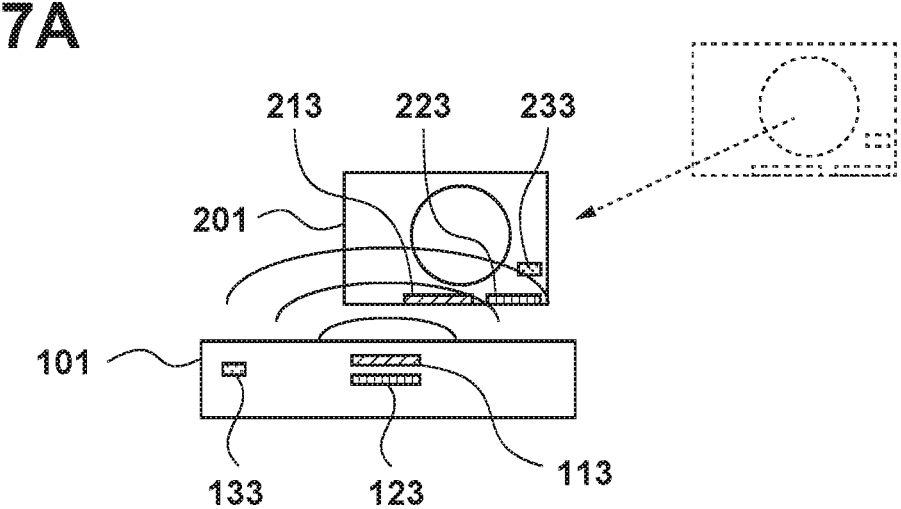
FIGS. 7A to 7C show positional relationships between the power transmitting apparatus and the power receiving apparatus according to the first embodiment.
Figure 7B:
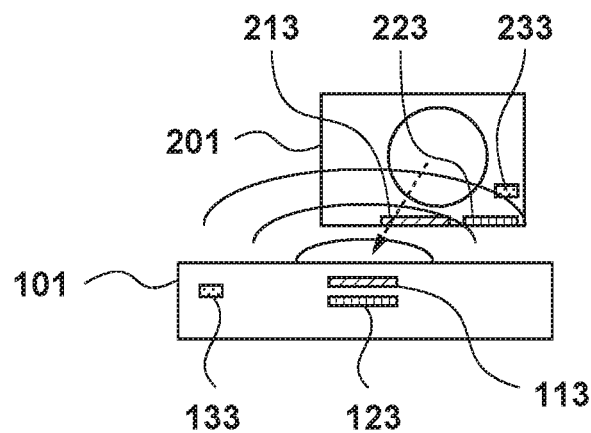
Figure 7C:
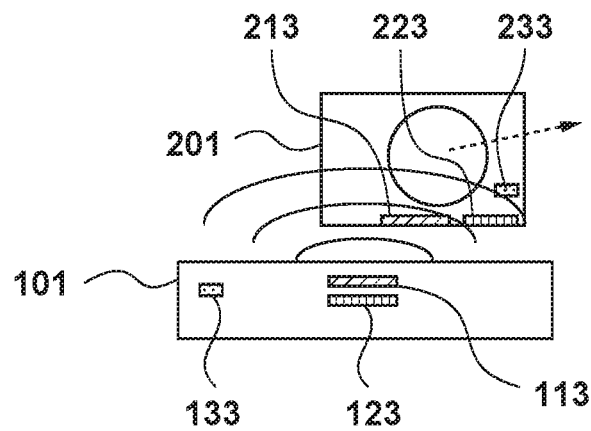

FIGS. 7A to 7C show exemplary positional relationships between the power transmitting apparatus 101 and the power receiving apparatus 201 during the wireless power supply processing shown in the flowcharts of FIGS. 4A and 4B. FIG. 7A shows an exemplary positional relationship for a case in which wireless power supply is performed when the power transmitting apparatus 101 and the power receiving apparatus 201 that were away from each other are brought in proximity to each other. FIG. 7B shows an exemplary positional relationship for a case in which, when wireless power supply is in operation while the power transmitting apparatus 101 and the power receiving apparatus 201 are in proximity to each other, the power transmitting apparatus 101 and the power receiving apparatus 201 are brought much closer to each other. FIG. 7C shows an exemplary positional relationship for a case in which, when wireless power supply is in operation while the power transmitting apparatus 101 and the power receiving apparatus 201 are in proximity to each other, the power transmitting apparatus 101 and the power receiving apparatus 201 are brought away from each other.

First, the operations of the power transmitting apparatus 101 will be described using FIG. 4A.

In step S411, the TX control unit 102 of the power transmitting apparatus 101 transmits auxiliary power by controlling the TX power transmitting unit A 111. In the present embodiment, it will be assumed that the frequency of the auxiliary power transmitted in step S411 is 6.78 MHz, and the transmitted power has an arbitrary value, for example, 0.25 W.

In step S412, the TX control unit 102 of the power transmitting apparatus 101 determines whether the TX communication unit C 131 has received a polling signal from the power receiving apparatus 201. In receiving the polling signal for short-range wireless communication in step S412, for example, packets are received in an advertise mode of Bluetooth Low Energy®. As protocols of Bluetooth Low Energy (hereinafter, BLE) are commonly used techniques, a description thereof will be omitted.

If the TX control unit 102 of the power transmitting apparatus 101 determines that the TX communication unit C 131 has received the polling signal from the power receiving apparatus 201 in step S412, the processing proceeds to step S413.

In step S413, the TX control unit 102 of the power transmitting apparatus 101 causes the TX communication unit C 131 to transmit a connection request, and then the processing proceeds to step S414.

If the TX control unit 102 of the power transmitting apparatus 101 determines that the TX communication unit C 131 has not received the polling signal from the power receiving apparatus 201 in step S412, the processing returns to step S411, and auxiliary power is transmitted again.

In the present embodiment, it will be assumed that the power receiving apparatus 201 transmits the polling signal, the power transmitting apparatus 101 discovers the power receiving apparatus 201 by receiving the polling signal, and the power transmitting apparatus 101 transmits the connection request to perform short-range wireless communication.

When the power transmitting apparatus 101 and the power receiving apparatus 201 that were away from each other are brought in proximity to each other as shown in FIG. 7A, the power transmitting apparatus 101 receives the polling signal transmitted by the power receiving apparatus 201 in step S412; this makes it possible to proceed to a wireless power supply sequence.

In step S414, apparatus status information containing the following information is transmitted and received between the TX control unit 102 of the power transmitting apparatus 101 and the power receiving apparatus 201: "power reception capability," "maximum received power," and "power requested to be transmitted/received." The apparatus status information that is transmitted and received in step S414 is, for example, the information shown in FIG. 6A.

In step S415, based on "power reception capability" in the apparatus status information received in step S414, the TX control unit 102 of the power transmitting apparatus 101 determines whether the power receiving apparatus 201 is currently capable of receiving power wirelessly.

If the TX control unit 102 of the power transmitting apparatus 101 determines that the power receiving apparatus 201 is currently incapable of receiving power wirelessly in step S415, the processing returns to step S411, and auxiliary power is transmitted again. If the TX control unit 102 of the power transmitting apparatus 101 determines that the power receiving apparatus 201 is currently capable of receiving power wirelessly in step S415, the processing proceeds to step S416.

In step S416, the TX control unit 102 of the power transmitting apparatus 101 sets transmitted/received power in accordance with "maximum received power" and "power requested to be transmitted/received" in the apparatus status information that was transmitted and received in step S414. Specifically, in step S416, the transmitted/received power is set at 2.8 W based on "power requested to be transmitted/received" of the power receiving apparatus 201. It will be assumed that the transmitted/received power set in step S416 does not exceed "maximum received power."

In step S417, the TX control unit 102 of the power transmitting apparatus 101 wirelessly transmits power to the power receiving apparatus 201 by controlling the TX power transmitting unit A 111. In wireless power transmission of step S417, the TX matching circuit A 112 is set to be appropriate for wireless power transmission from the TX power transmitting unit A 111.

It will be assumed hereinafter that, in transmitting power by controlling the TX power transmitting unit A 111, the TX matching circuit A 112 is set to be appropriate for wireless power transmission from the TX power transmitting unit A 111, and this explanation will be omitted.

In step S418, apparatus status information containing the following information is transmitted and received between the TX control unit 102 of the power transmitting apparatus 101 and the power receiving apparatus 201: "power reception capability," "battery voltage," "charge completion flag," "charge completion voltage," "remaining battery level," and "power requested to be transmitted/received."

In step S419, based on one of "battery voltage," "charge completion voltage," "charge completion flag," and "remaining battery level" in the apparatus status information, the TX control unit 102 of the power transmitting apparatus 101 determines whether charging of the RX battery 203 of the power receiving apparatus 201 has been completed.

If the TX control unit 102 of the power transmitting apparatus 101 determines that charging of the RX battery 203 of the power receiving apparatus 201 has not been completed in step S419, the processing returns to step S415.

If the TX control unit 102 of the power transmitting apparatus 101 determines that charging of the RX battery 203 of the power receiving apparatus 201 has been completed in step S419, the processing ends.

Next, the operations of the power receiving apparatus 201 will be described using FIG. 4B.

In step S421, the RX control unit 202 of the power receiving apparatus 201 receives auxiliary power transmitted from the power transmitting apparatus 101 via the RX power receiving antenna A 213. Current generated in the RX power receiving antenna A 213 is rectified and smoothed by the RX rectification smoothing circuit A 211, and the RX constant voltage circuit B 286 supplies voltage to the RX control unit 202.

When the remaining battery level of the RX battery 203 of the power receiving apparatus 201 is low, the RX control unit 202 of the power receiving apparatus 201 starts operating on the auxiliary power that was transmitted from the power transmitting apparatus 101 and received in step S421. When the remaining battery level of the RX battery 203 of the power receiving apparatus 201 is sufficient, the RX control unit 202 of the power receiving apparatus 201 may start operating on power of the RX battery 203 supplied from the RX charge control circuit 282.

In step S422, the RX control unit 202 of the power receiving apparatus 201 causes the RX communication unit C 231 to transmit a polling signal for short-range wireless communication to the power transmitting apparatus 101. It will be assumed that, in transmitting the polling signal for short-range wireless communication in step S422, packets are transmitted in an advertise mode of BLE, for example.

In step S423, the RX control unit 202 of the power receiving apparatus 201 determines whether the RX communication unit C 231 has received a connection request signal for short-range wireless communication from the power transmitting apparatus 101.

If the RX control unit 202 of the power receiving apparatus 201 determines that the RX communication unit C231 has received the connection request signal from the power transmitting apparatus 101 in step S423, the processing proceeds to step S424.

If the RX control unit 202 of the power receiving apparatus 201 determines that the RX communication unit C231 has not received the connection request signal from the power transmitting apparatus 101 in step S423, the processing returns step S421, and auxiliary power is received again.

In step S424, the RX control unit 202 of the power receiving apparatus 201 connects to the power transmitting apparatus 101 in accordance with the connection request received in step S423. In step S424, the power transmitting apparatus 101 and the power receiving apparatus 201 transmit and receive apparatus status information containing the following information: "power reception capability," "maximum received power," and "power requested to be transmitted/received." The apparatus status information that is transmitted and received in step S424 is, for example, the information shown in FIG. 6A.

In step S425, the RX control unit 202 of the power receiving apparatus 201 sets received power so as to optimize the charging conditions of the RX battery 203 for "power requested to be transmitted/received" in the apparatus status information by controlling the RX charge control circuit 282 in accordance with "power requested to be transmitted/received." Once the process of step S416 in the power transmitting apparatus 101 and the process of step S425 in the power receiving apparatus 201 have finished, the power transmitting apparatus 101 and the power receiving apparatus 201 can wirelessly transmit and receive power.

In step S426, the RX control unit 202 of the power receiving apparatus 201 wirelessly receives power from the power transmitting apparatus 101.

In step S450, the RX control unit 202 of the power receiving apparatus 201 performs a voltage stabilization operation in a later-described power receiving sub-sequence because the voltage of the output portion of the RX rectification smoothing circuit A 211 changes transiently depending on the characteristics of the RX power receiving antenna A 213 and the positional relationship between the power transmitting apparatus 101 and the power receiving apparatus 201.

In step S427, the RX control unit 202 of the power receiving apparatus 201 determines whether charging of the RX battery 203 has been completed.

If the RX control unit 202 of the power receiving apparatus 201 determines that charging of the RX battery 203 has been completed in step S427, the processing proceeds to step S429.

In step S429, in order to give notice of the completion of charging of the RX battery 203, the RX control unit 202 of the power receiving apparatus 201 sets "power reception capability" and "charge completion flag" in the apparatus status information to indicate "incapable" and "completed," respectively, as shown in FIG. 6B. Then, the apparatus status information containing the following information is transmitted and received between the RX control unit 202 of the power receiving apparatus 201 and the power transmitting apparatus 101: "power reception capability," "battery voltage," "charge completion flag," "charge completion voltage," and "remaining battery level."

After the apparatus status information has been transmitted and received between the RX control unit 202 of the power receiving apparatus 201 and the power transmitting apparatus 101 in step S429, the processing ends.

After the processing of the present flowchart has ended, when wireless power supply is performed again using the power receiving apparatus 201 that has been brought away from the power transmitting apparatus 101, the processing of the present flowchart can be executed from the beginning by bringing the power receiving apparatus 201 in proximity to the power transmitting apparatus 101.

If the RX control unit 202 of the power receiving apparatus 201 determines that the RX battery 203 is not fully charged in step S427, the processing proceeds to step S428.

In step S428, in order to give notice of the incompletion of charging of the RX battery 203, the RX control unit 202 of the power receiving apparatus 201 obtains the latest state of the RX battery 203. Then, the RX control unit 202 of the power receiving apparatus 201 sets "power requested to be transmitted/received" to indicate the latest information in accordance with power required to charge the RX battery 203.

Furthermore, in step S428, the power transmitting apparatus 101 and the RX control unit 202 of the power receiving apparatus 201 transmit and receive the apparatus status information containing "battery voltage," "charge completion flag," "charge completion voltage," "remaining battery level," and "power requested to be transmitted/received," and then the processing returns to step S205.

Figure 5:
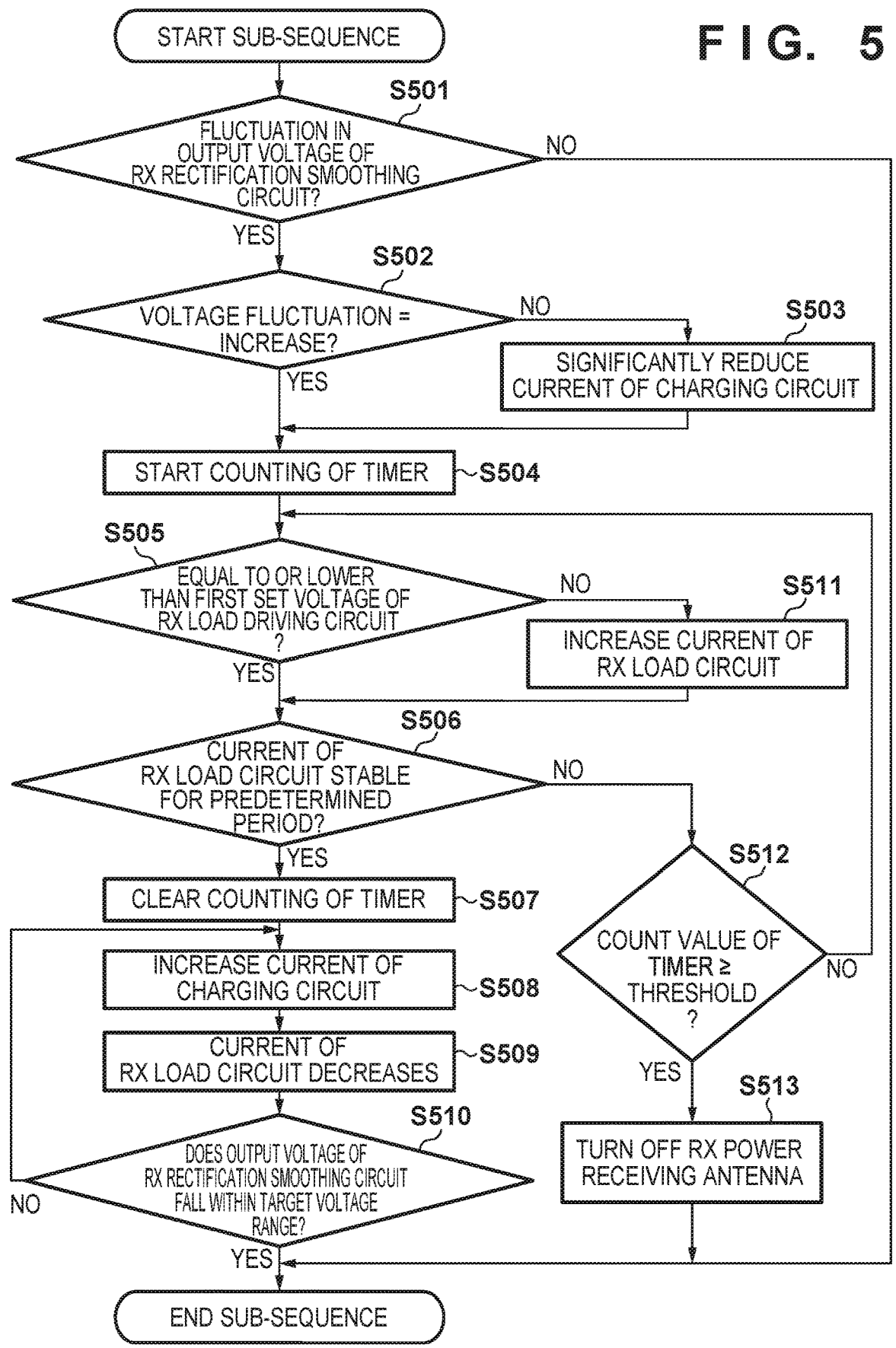
FIG. 5 is a flowchart of control over the output voltage of a rectification smoothing circuit of the power receiving apparatus according to the first embodiment.

Using FIG. 5, the following describes the power receiving sub-sequence of step S450 that performs control to suppress a transient voltage fluctuation of the output portion of the RX rectification smoothing circuit A 211 in the power receiving apparatus 201 during wireless power supply.

In step S501, the RX control unit 202 of the power receiving apparatus 201 determines whether the output voltage of the RX rectification smoothing circuit A 211 has fluctuated. The output voltage of the RX rectification smoothing circuit A 211 that is used in the voltage fluctuation determination of step S501 can be measured as a value of voltage that has been divided using resistors by driving Tr4 and Tr2 of the RX load driving circuit 273 in accordance with a control signal from the RX control unit 202. The output voltage of the RX rectification smoothing circuit A 211 may be determined to have fluctuated if the output voltage is different from a previously measured value by a prescribed voltage difference, for example, Δ0.5 V or Δ1.0 V.

If the RX control unit 202 of the power receiving apparatus 201 determines that the output voltage of the RX rectification smoothing circuit A 211 has not fluctuated in step S501, the processing ends.

If the RX control unit 202 of the power receiving apparatus 201 determines that the output voltage of the RX rectification smoothing circuit A 211 has fluctuated in step S501, the processing proceeds to step S502.

In step S502, the RX control unit 202 of the power receiving apparatus 201 determines whether the fluctuation in the output voltage of the RX rectification smoothing circuit A 211 is an increase.

If the RX control unit 202 of the power receiving apparatus 201 determines that the fluctuation in the output voltage of the RX rectification smoothing circuit A 211 is an increase in step S502, the processing proceeds to step S504.

In step S504, the RX control unit 202 of the power receiving apparatus 201 causes a timer in the RX control unit 202 to start counting.

If the RX control unit 202 of the power receiving apparatus 201 determines that the fluctuation in the output voltage of the RX rectification smoothing circuit A 211 is not an increase in step S502, the processing proceeds to step S503.

In step S503, the RX control unit 202 of the power receiving apparatus 201 significantly reduces charging current that is supplied from the RX charge control circuit 282 to the RX battery 203, and then the processing proceeds to step S504. In significantly reducing the charging current from the RX charge control circuit 282 in step S503, for example, the charging current may be reduced to zero or may be reduced to one-fifth.

In step S505, the RX load driving circuit 273 of the power receiving apparatus 201 determines whether the output voltage of the RX rectification smoothing circuit A 211 is equal to or lower than the actuation voltage therefor, that is, the first set voltage VLD1.

If the RX load driving circuit 273 of the power receiving apparatus 201 determines that the output voltage of the RX rectification smoothing circuit A 211 is equal to or lower than the first set voltage VLD1 in step S505, the RX load driving circuit 273 is not actuated or maintains the current of the RX load circuit 272, and then the processing proceeds to step S506.

If the RX load driving circuit 273 of the power receiving apparatus 201 determines that the output voltage of the RX rectification smoothing circuit A 211 has exceeded the first set voltage VLD1 in step S505, the processing proceeds to step S511.

In step S511, the RX load driving circuit 273 increases the current of the RX load circuit 272, and then the processing proceeds to step S506.

In step S506, the RX control unit 202 of the power receiving apparatus 201 determines whether the current of the RX load circuit 272 has been stable for a predetermined period. In the present embodiment, the predetermined period used in the determination of step S506 is expressed as Tsta. In detecting the load current of the RX load circuit 272 in the determination of step S506, a value of voltage that has been divided using resistors by driving Tr4 and Tr3 of the RX load driving circuit 273 in accordance with a control signal from the RX control unit 202 can be measured and converted into a current value. The current value of the RX load circuit 272 may be determined to have been stable for the predetermined period if the difference between the current value and a previously measured value is within a prescribed current difference range, for example, ±Δ10 mA or ±20 mA.

If the RX control unit 202 of the power receiving apparatus 201 determines that the current of the RX load circuit 272 has been stable for the predetermined period in step S506, the processing proceeds to step S507, and counting of the timer that started in step S504 is cleared.

If the RX control unit 202 of the power receiving apparatus 201 determines that the current of the RX load circuit 272 has not been stable for the predetermined period in step S506, the processing proceeds to step S512.

In step S512, the RX control unit 202 of the power receiving apparatus 201 determines whether a count value of the timer that started counting in step S504 is equal to or larger than a threshold.

If the RX control unit 202 of the power receiving apparatus 201 determines that the count value of the timer is smaller than the threshold in step S512, the processing returns to step S505.

If the RX control unit 202 of the power receiving apparatus 201 determines that the count value of the timer is equal to or larger than the threshold in step S512, the processing proceeds to step S513.

In step S513, the RX control unit 202 of the power receiving apparatus 201 turns OFF the RX power receiving antenna A 213 by controlling the antenna switch circuit FSW-1A 214, thereby suspending the wireless power reception. Then, "power reception capability" in the apparatus status information is set to indicate "incapable" as shown in FIG. 6C to end the power supply sub-sequence, and accordingly, the present processing ends.

By turning OFF the RX power receiving antenna A 213 in step S513, circuits of the power receiving apparatus 201 can be protected when the increase in the current of the RX load circuit 272 due to actuation of the RX load driving circuit 273 has continued for the predetermined period or longer.

After counting of the timer has been cleared in step S507, the processing proceeds to step S508 in which the RX control unit 202 of the power receiving apparatus 201 increases the charging current of the RX charge control circuit 282, and then the processing proceeds to step S509.

In step S509, the current of the RX load circuit 272 decreases along with the increase in the charging current in step S508, and then the processing proceeds to step S510.

In step S510, the RX control unit 202 of the power receiving apparatus 201 determines whether the output voltage of the RX rectification smoothing circuit A 211 falls within a first control target voltage range. In the present embodiment, it will be assumed that the first control target voltage range of step S510 is from VTGA1A to VTG2A.

If the RX control unit 202 of the power receiving apparatus 201 determines that the output voltage of the RX rectification smoothing circuit A 211 falls within the first control target voltage range in step S510, the processing ends.

If the RX control unit 202 of the power receiving apparatus 201 determines that the output voltage of the RX rectification smoothing circuit A 211 does not fall within the first control target voltage range in step S510, the processing returns to step S508. By repeating the operations of steps S508 to S510, the voltage of the output portion of the RX rectification smoothing circuit A 211 and the charging current of the RX charge control circuit 282 can be set to satisfy the balanced, optimal conditions with respect to the power that the power receiving apparatus 201 wirelessly receives from the power transmitting apparatus 101.

To further elaborate the operations of steps S508 to S510, the increase in the charging current of the RX charge control circuit 282 in step S508 increases the output current from the output portion of the RX rectification smoothing circuit A 211 to the RX constant voltage circuit A281.

Provided that the power that the power receiving apparatus 201 wirelessly receives from the power transmitting apparatus 101 is constant, as the output portion of the RX rectification smoothing circuit A 211 operates as a constant voltage circuit, the increase in the output current of the RX rectification smoothing circuit A 211 reduces the output voltage of the RX rectification smoothing circuit A 211.

The reduction in the output voltage of the RX rectification smoothing circuit A 211 reduces the current with which the RX load driving circuit 273 drives the RX load circuit 272, thereby reducing the current of the RX load circuit 272 in step S509.

If the charging current of the RX charge control circuit 282 is further increased, the output voltage of the RX rectification smoothing circuit A 211 further decreases, the RX load driving circuit 273 becomes no longer actuated, and the current that drives the RX load circuit 272 reaches zero.

Figure 8:
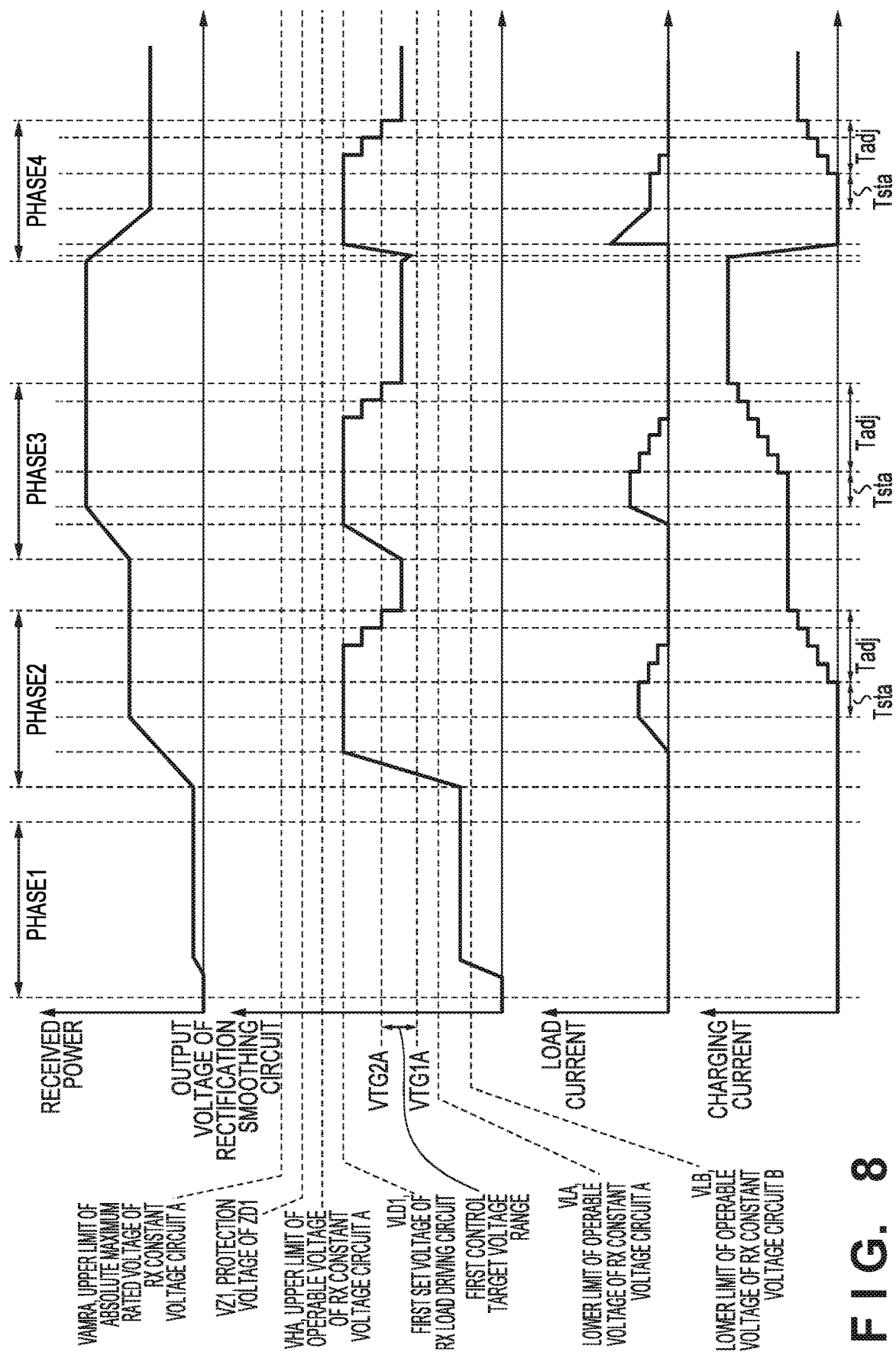
FIG. 8 is a diagram for describing the relationships among the power received by the power receiving apparatus, the output voltage of the rectification smoothing circuit, the current of the load circuit, and the charging current for a battery according to the first embodiment.

Using FIG. 8, the following describes the relationships among the power received by the power receiving apparatus, the output voltage of the rectification smoothing circuit, the current of the load circuit, and the charging current for the battery in correspondence with the flowcharts of FIGS. 4A to 5 in view of the exemplary arrangements shown in FIGS. 7A to 7C.

The operations of PHASE1 and PHASE2 in FIG. 8 are carried out to perform wireless power supply when the power transmitting apparatus 101 and the power receiving apparatus 201 that were away from each other are brought in proximity to each other as shown in FIG. 7A.

First, the operations of PHASE1 in FIG. 8 will be described.

When the power transmitting apparatus 101 and the power receiving apparatus 201 that were away from each other are brought in proximity to each other, the power receiving apparatus 201 receives auxiliary power transmitted by the power transmitting apparatus 101, and the RX rectification smoothing circuit A 211 generates the output voltage.

When the output voltage of the RX rectification smoothing circuit A 211 has exceeded VLB, which is the lower limit of the operable voltage of the RX constant voltage circuit B 286, the RX constant voltage circuit B 286 outputs voltage, the RX control unit 202 and the RX communication unit C 231 start operating, and the power receiving apparatus 201 and the power transmitting apparatus 101 start wireless communication.

The operations of PHASE2 in FIG. 8 will now be described.

Once the power receiving apparatus 201 and the power transmitting apparatus 101 have started wireless communication, the power transmitting apparatus 101 sets transmitted/received power in accordance with "power requested to be transmitted/received" in apparatus status information of the power receiving apparatus 201, and wirelessly transmits power.

As the power receiving apparatus 201 receives the power transmitted by the power transmitting apparatus 101, the output voltage of the RX rectification smoothing circuit A 211 increases. In an example of FIG. 8, the output voltage exceeds VLA, which is the lower limit of the operable voltage of the RX constant voltage circuit A 281, and reaches the first set voltage VLD1, which is the actuation voltage for the RX load driving circuit 273.

As the output voltage of the RX rectification smoothing circuit A 211 has reached the first set voltage VLD1, which is the actuation voltage, the RX load driving circuit 273 outputs current that drives the RX load circuit 272, and thus the load current flows through the RX load circuit 272. At this point, the charging current does not flow through the RX charge control circuit 282 yet.

If the load current flowing through the RX load circuit 272 has been stable for the predetermined period (Tsta), the RX control unit 202 increases the charging current of the RX charge control circuit 282 by controlling the RX charge control circuit 282, and consequently, the load current flowing through the RX load circuit 272 is reduced.

The increase in the charging current of the RX charge control circuit 282 reduces the load current flowing through the RX load circuit 272. If the output voltage of the RX rectification smoothing circuit A 211 consequently becomes equal to or lower than the actuation voltage VLD1 for the RX load driving circuit 273, the output voltage of the RX rectification smoothing circuit A 211 decreases.

As a result of increasing the charging current of the RX charge control circuit 282, reducing the load current of the RX load circuit 272, and reducing the output voltage of the RX rectification smoothing circuit A 211 gradually in the foregoing manner, the load current of the RX load circuit 272 reaches zero.

Consequently, the voltage of the output portion of the RX rectification smoothing circuit A 211 falls within the first control target voltage range of VTG1A to VTG2A. A period for controlling the voltage to fall within the first control target voltage range after the predetermined period Tsta is expressed as Tadj.

The operations of PHASE3 in FIG. 8 are performed on the occurrence of the following event as shown in FIG. 7B: when the wireless power supply is in operation while the power transmitting apparatus 101 and the power receiving apparatus 201 are in proximity to each other, the power transmitting apparatus 101 and the power receiving apparatus 201 are brought much closer to each other.

The operations of PHASE3 in FIG. 8 will now be described.

When the power transmitting apparatus 101 and the power receiving apparatus 201 are brought much closer to each other while the wireless power supply is in operation, the resultant positional relationship therebetween allows the power receiving apparatus 201 to receive power transmitted by the power transmitting apparatus 101 more easily; as a result, the received power, as well as the output voltage of the RX rectification smoothing circuit A 211, increases.

The increasing output voltage of the RX rectification smoothing circuit A 211 reaches the first set voltage VLD1, which is the actuation voltage for the RX load driving circuit 273.

As the output voltage of the RX rectification smoothing circuit A 211 has reached the first set voltage VLD1, which is the actuation voltage, the RX load driving circuit 273 outputs current that drives the RX load circuit 272, and thus the load current flows through the RX load circuit 272. The charging current has been continuously flowing from the RX charge control circuit 282 since PHASE2.

If the load current flowing through the RX load circuit 272 has been stable for the predetermined period (Tsta), the RX control unit 202 increases the charging current of the RX charge control circuit 282 by controlling the RX charge control circuit 282, and consequently, the load current flowing through the RX load circuit 272 is reduced.

The increase in the charging current of the RX charge control circuit 282 reduces the load current flowing through the RX load circuit 272. If the output voltage of the RX rectification smoothing circuit A 211 consequently becomes equal to or lower than the actuation voltage VLD1 for the RX load driving circuit 273, the output voltage of the RX rectification smoothing circuit A 211 decreases.

As a result of increasing the charging current of the RX charge control circuit 282, reducing the load current of the RX load circuit 272, and reducing the output voltage of the RX rectification smoothing circuit A 211 gradually in the foregoing manner, the load current of the RX load circuit 272 reaches zero.

Consequently, the voltage of the output portion of the RX rectification smoothing circuit A 211 falls within the first control target voltage range of VTG1A to VTG2A. A period for controlling the voltage to fall within the first control target voltage range after Tsta is expressed as Tadj.

The operations of PHASE3 are performed when the power transmitting apparatus 101 and the power receiving apparatus 201 enter into a positional relationship that further improves the power supply efficiency. The operations of PHASE3 can be implemented as other operations. For example, the operations similar to PHASE3 can be implemented also when power transmitted from the power transmitting apparatus 101 has been increased without changing the arrangement of the power transmitting apparatus 101 and the power receiving apparatus 201.

The operations of PHASE4 in FIG. 8 are performed on the occurrence of the following event as shown in FIG. 7C: when the wireless power supply is in operation while the power transmitting apparatus 101 and the power receiving apparatus 201 are in proximity to each other, the power transmitting apparatus 101 and the power receiving apparatus 201 are brought away from each other.

The operations of PHASE4 in FIG. 8 will now be described.

When the power transmitting apparatus 101 and the power receiving apparatus 201 are brought away from each other while the wireless power supply is in operation, the resultant positional relationship therebetween makes it difficult for the power receiving apparatus 201 to receive power transmitted by the power transmitting apparatus 101; as a result, the received power, as well as the output voltage of the RX rectification smoothing circuit A 211, decreases.

Before the decreasing output voltage of the RX rectification smoothing circuit A 211 reaches VTG1A, which is the lower limit of the first control target voltage range, the RX control unit 202 reduces the charging current of the RX charge control circuit 282 by controlling the RX charge control circuit 282.

As the charging current of the RX charge control circuit 282 is reduced, the output voltage of the RX rectification smoothing circuit A 211 increases and reaches the first set voltage VLD1, which is the actuation voltage for the RX load driving circuit 273.

As the output voltage of the RX rectification smoothing circuit A 211 has reached the first set voltage VLD1, which is the actuation voltage, the RX load driving circuit 273 outputs current that drives the RX load circuit 272, and thus the load current flows through the RX load circuit 272. The charging current of the RX charge control circuit 282 has been temporarily suspended since the transition to PHASE4.

If the load current flowing through the RX load circuit 272 has been stable for the predetermined period (Tsta), the RX control unit 202 increases the charging current of the RX charge control circuit 282 by controlling the RX charge control circuit 282, and consequently, the load current flowing through the RX load circuit 272 is reduced.

If the output voltage of the RX rectification smoothing circuit A 211 becomes equal to or lower than the actuation voltage VLD1 for the RX load driving circuit 273 along with the reduction in the load current flowing through the RX load circuit 272 following the increase in the charging current of the RX charge control circuit 282, the output voltage of the RX rectification smoothing circuit A 211 decreases.

As a result of increasing the charging current of the RX charge control circuit 282, reducing the load current of the RX load circuit 272, and reducing the output voltage of the RX rectification smoothing circuit A 211 gradually in the foregoing manner, the load current of the RX load circuit 272 reaches zero.

Consequently, the voltage of the output portion of the RX rectification smoothing circuit A 211 falls within the first control target voltage range of VTG1A to VTG2A. A period for controlling the voltage to match the control target voltage after the predetermined period Tsta is expressed as Tadj.

The operations of PHASE4 are performed when the power transmitting apparatus 101 and the power receiving apparatus 201 enter into a positional relationship that further reduces the power supply efficiency. The operations of PHASE4 can be implemented as other operations. For example, the operations similar to PHASE4 can be implemented also when power transmitted from the power transmitting apparatus 101 has been reduced without changing the arrangement of the power transmitting apparatus 101 and the power receiving apparatus 201.

As described above, the present embodiment suppresses a voltage fluctuation where the output voltage of a circuit with a possibility of entering a transient state due to, for example, a change in transmitted power and a positional relationship between apparatuses becomes equal to or higher than an operable voltage of a circuit in a subsequent stage, or becomes lower than the operable voltage, when wireless power supply to the power receiving apparatus 201 has been started. This can prevent circuits from shutting down, and from repeating the shutdown and activation.

Furthermore, as circuits can be controlled so as to charge the battery with charging current that is optimal for power that is wirelessly received by the power receiving apparatus 201, the operable voltage ranges and the optimal charging current can both be maintained.

Second Embodiment

A second embodiment will now be described using FIGS. 9 and 10.

In the first embodiment, wireless communication and wireless power transmission/reception are performed between the power transmitting apparatus 101 and the power receiving apparatus 201, and when the voltage of the output unit of the circuit that rectifies and smoothes wireless power in the power receiving apparatus 201 has increased or fluctuated, processing for stabilizing the voltage of the output unit is executed.

In the second embodiment, when the voltage of an output unit of a circuit that rectifies and smoothes wireless power in a power receiving apparatus 901 has increased or fluctuated, processing for stabilizing the voltage of the output unit is executed; note that the power receiving apparatus 901 is the same as the power receiving apparatus 201 according to the first embodiment, except that it does not include the RX constant voltage circuit A 281.

Figure 9:
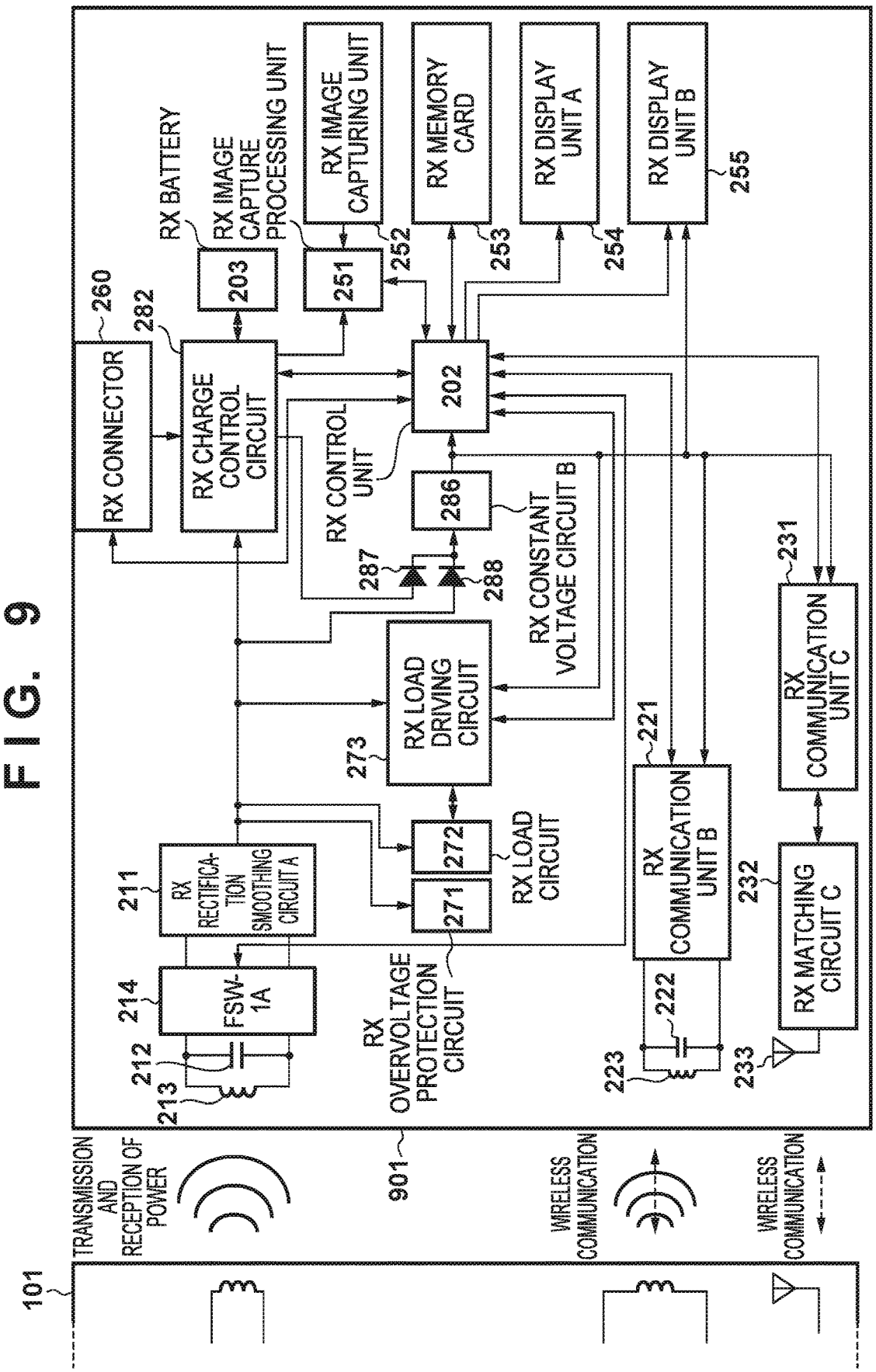
FIG. 9 is a block diagram showing an exemplary configuration of a power receiving apparatus according to a second embodiment.

FIG. 9 is a block diagram showing an exemplary configuration of the power receiving apparatus 901 according to the present embodiment. The power receiving apparatus 901 can wirelessly receive power from the power transmitting apparatus 101.

The power receiving apparatus 901 according to the present embodiment have the same components as the power receiving apparatus 201 shown in FIG. 2 according to the first embodiment, except that it does not include the RX constant voltage circuit A 281; therefore, the same components are given the same reference signs, and a description thereof will be omitted. Furthermore, a specific description of the blocks and operations that are not necessary for the description of the present embodiment will be omitted.

The RX rectification smoothing circuit A 211 rectifies AC voltage generated by power received from the power transmitting apparatus into DC voltage.

In the power receiving apparatus 201 according to the first embodiment, once the rectification smoothing circuit A 211 has rectified the AC voltage into the DC voltage, the RX constant voltage circuit A 281 transforms the DC voltage into constant voltage and supplies the constant voltage to the RX charge control circuit 282 in a subsequent stage. In contrast, in the power receiving apparatus 901 according to the present embodiment, once the rectification smoothing circuit A 211 has rectified the AC voltage into the DC voltage, the DC voltage is supplied directly to the RX charge control circuit 282 in a subsequent stage.

It will be assumed that the operable voltage range of the RX charge control circuit 282 is narrower than the operable voltage range of the RX constant voltage circuit A 281; for example, the operable voltage range of the RX charge control circuit 282 is 4 V to 7 V.

It will also be assumed that the absolute maximum rated voltage of the RX charge control circuit 282 is lower than the absolute maximum rated voltage of the RX constant voltage circuit A 281; for example, the absolute maximum rated voltage of the RX charge control circuit 282 is −0.3 V to 30 V.

In the present embodiment, an upper limit of the absolute maximum rated voltage of the RX charge control circuit 282 is expressed as VAMRCHG, a lower limit of the operable voltage of the RX charge control circuit 282 is expressed as VLCHG, and an upper limit of the operable voltage of the RX charge control circuit 282 is expressed as VHCHG.

It is sufficient to set the voltage that actuates the RX overvoltage protection circuit 271 so that it does not exceed the absolute maximum rated voltage of the RX charge control circuit 282. For example, when the absolute maximum rated voltage of the RX charge control circuit 282 is 30 V, it is sufficient to set a protection voltage that actuates the RX overvoltage protection circuit 271 at approximately 24 V. In the present embodiment, the protection voltage of the RX overvoltage protection circuit 271 is expressed as VZ1CHG.

It is sufficient to set the voltage that actuates the RX load driving circuit 273 and the RX load circuit 272 so that it does not exceed VHCHQ, which is the upper limit of the operable voltage of the RX charge control circuit 282. For example, when the upper limit of the operable voltage of the RX charge control circuit 282 is 7 V, it is sufficient to set the voltage that actuates the RX load driving circuit 273 and the RX load circuit 272 at approximately 6 V. In the present embodiment, the voltage that actuates the RX load circuit 272 is expressed as a second set voltage VLD2.

As the wireless power supply operation according to the present embodiment is similar to the flowcharts of FIGS. 4A and 4B according to the first embodiment, a description thereof will be omitted.

Figure 10:
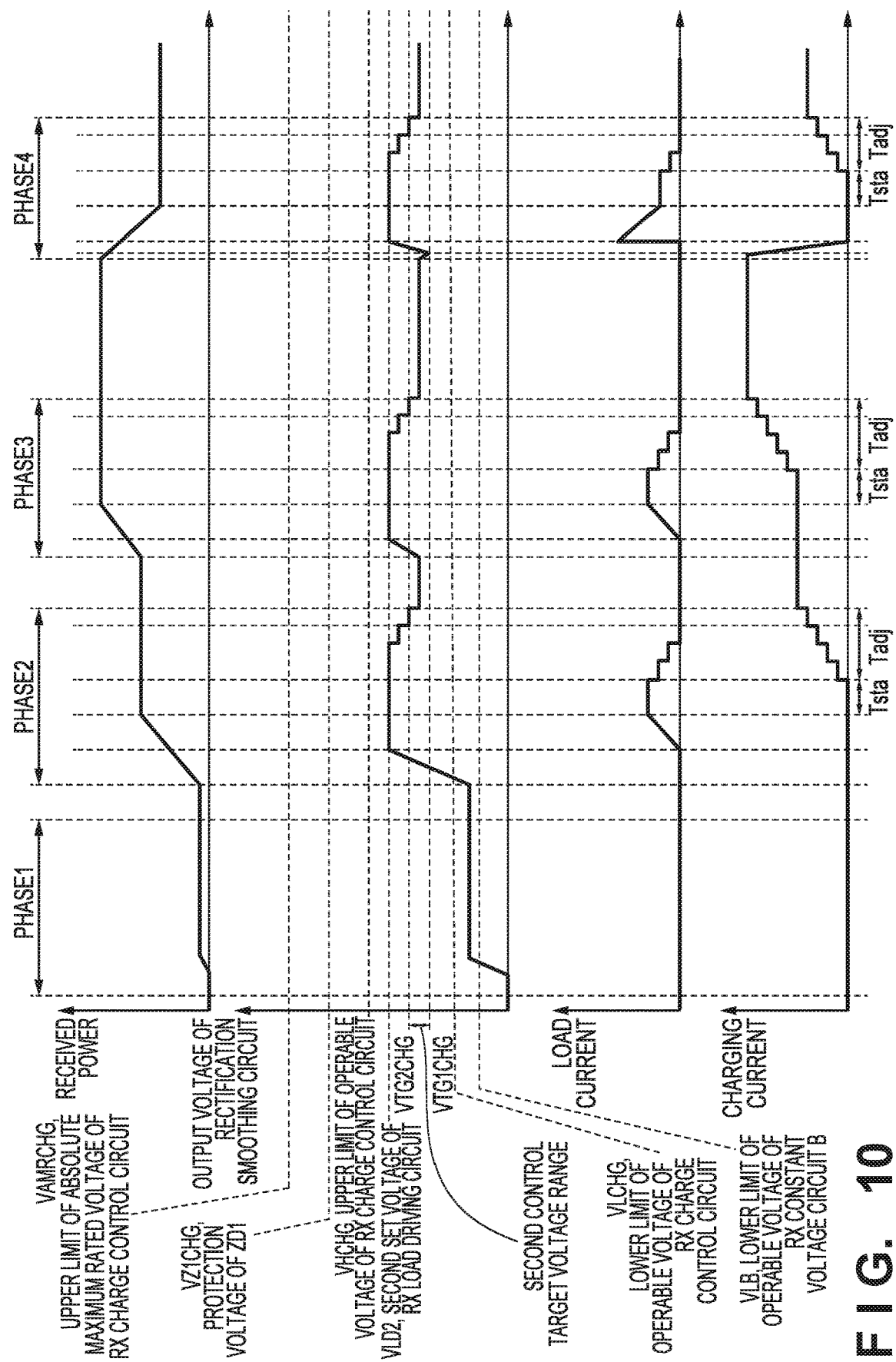
FIG. 10 is a diagram for describing the relationships among the power received by the power receiving apparatus, the output voltage of a rectification smoothing circuit, the current of a load circuit, and the charging current for a battery according to the second embodiment.

Using FIG. 10, the following describes the relationships among the power received by the power receiving apparatus 901, the output voltage of the rectification smoothing circuit, the current of the load circuit, and the charging current of the battery in correspondence with the flowcharts of FIGS. 4A to 5 in view of the exemplary arrangements shown in FIGS. 7A to 7C.

The operations of PHASE1 and PHASE2 in FIG. 10 are carried out to perform wireless power supply when the power transmitting apparatus 101 and the power receiving apparatus 901 that were away from each other are brought in proximity to each other as shown in FIG. 7A.

The operations of PHASE1 in FIG. 10 will now be described. When the power transmitting apparatus 101 and the power receiving apparatus 901 that were away from each other are brought in proximity to each other, the power receiving apparatus 901 receives auxiliary power transmitted by the power transmitting apparatus 101, and the RX rectification smoothing circuit A 211 generates the output voltage.

When the output voltage of the RX rectification smoothing circuit A 211 has exceeded VLB, which is the lower limit of the operable voltage of the RX constant voltage circuit B 286, the RX constant voltage circuit B 286 outputs voltage, the RX control unit 202 and the RX communication unit C 231 start operating, and the power receiving apparatus 901 and the power transmitting apparatus 101 start wireless communication.

The operations of PHASE2 in FIG. 10 will now be described. Once the power receiving apparatus 901 and the power transmitting apparatus 101 have started wireless communication, the power transmitting apparatus 101 sets transmitted/received power in accordance with "power requested to be transmitted/received" in apparatus status information of the power receiving apparatus 901, and wirelessly transmits power.

As the power receiving apparatus 901 receives the power transmitted by the power transmitting apparatus 101, the output voltage of the RX rectification smoothing circuit A 211 increases. In an example of FIG. 10, the output voltage exceeds VLCHG, which is the lower limit of the operable voltage of the RX charge control circuit 282, and reaches the second set voltage VLD2, which is the actuation voltage for the RX load driving circuit 273.

As the output voltage of the RX rectification smoothing circuit A 211 has reached the second set voltage VLD2, which is the actuation voltage, the RX load driving circuit 273 outputs current that drives the RX load circuit 272, and thus the load current flows through the RX load circuit 272. At this point, the charging current does not flow through the RX charge control circuit 282 yet.

If the load current flowing through the RX load circuit 272 has been stable for the predetermined period (Tsta), the RX control unit 202 increases the charging current of the RX charge control circuit 282 by controlling the RX charge control circuit 282, and consequently, the load current flowing through the RX load circuit 272 decreases.

The increase in the charging current of the RX charge control circuit 282 reduces the load current flowing through the RX load circuit 272. If the output voltage of the RX rectification smoothing circuit A 211 consequently becomes equal to or lower than the actuation voltage VLD2 for the RX load driving circuit 273, the output voltage of the RX rectification smoothing circuit A 211 decreases.

As a result of increasing the charging current of the RX charge control circuit 282, reducing the load current of the RX load circuit 272, and reducing the output voltage of the RX rectification smoothing circuit A 211 gradually in the foregoing manner, the load current of the RX load circuit 272 reaches zero.

Consequently, the voltage of the output portion of the RX rectification smoothing circuit A 211 falls within a second control target voltage range of VTG1CHG to VTG2A. A period for controlling the voltage to fall within the second control target voltage range after the predetermined period Tsta is expressed as Tadj.

The operations of PHASE3 in FIG. 10 are performed on the occurrence of the following event as shown in FIG. 7B: when the wireless power supply is in operation while the power transmitting apparatus 101 and the power receiving apparatus 901 are in proximity to each other, the power transmitting apparatus 101 and the power receiving apparatus 901 are brought much closer to each other.

The operations of PHASE3 in FIG. 10 will now be described. When the power transmitting apparatus 101 and the power receiving apparatus 901 are brought much closer to each other while the wireless power supply is in operation, the resultant arrangement state thereof allows the power receiving apparatus 901 to receive power transmitted by the power transmitting apparatus 101 more easily; as a result, the received power, as well as the output voltage of the RX rectification smoothing circuit A 211, increases.

The increasing output voltage of the RX rectification smoothing circuit A 211 reaches the second set voltage VLD2, which is the actuation voltage for the RX load driving circuit 273.

As the output voltage of the RX rectification smoothing circuit A 211 has reached the second set voltage VLD2, which is the actuation voltage, the RX load driving circuit 273 outputs current that drives the RX load circuit 272, and thus the load current flows through the RX load circuit 272. The charging current has been continuously flowing from the RX charge control circuit 282 since PHASE2.

If the load current flowing through the RX load circuit 272 has been stable for the predetermined period (Tsta), the RX control unit 202 increases the charging current of the RX charge control circuit 282 by controlling the RX charge control circuit 282, and consequently, the load current flowing through the RX load circuit 272 is reduced.

The increase in the charging current of the RX charge control circuit 282 reduces the load current flowing through the RX load circuit 272. If the output voltage of the RX rectification smoothing circuit A 211 consequently becomes equal to or lower than the actuation voltage VLD2 for the RX load driving circuit 273, the output voltage of the RX rectification smoothing circuit A 211 decreases.

As a result of increasing the charging current of the RX charge control circuit 282, reducing the load current of the RX load circuit 272, and reducing the output voltage of the RX rectification smoothing circuit A 211 gradually in the foregoing manner, the load current of the RX load circuit 272 reaches zero.

Consequently, the voltage of the output portion of the RX rectification smoothing circuit A 211 falls within the second control target voltage range of VTG1CHG to VTG2CHG. A period for controlling the voltage to fall within the second control target voltage range after the predetermined period Tsta is expressed as Tadj.

The operations of PHASE3 are performed when the power transmitting apparatus 101 and the power receiving apparatus 901 enter into an arrangement state that further improves the power supply efficiency. The operations of PHASE3 can be implemented as other operations. For example, the operations similar to PHASE3 can be implemented also when power transmitted from the power transmitting apparatus 101 has been increased without changing the arrangement of the power transmitting apparatus 101 and the power receiving apparatus 901.

The operations of PHASE4 in FIG. 10 are performed on the occurrence of the following event as shown in FIG. 7C: when the wireless power supply is in operation while the power transmitting apparatus 101 and the power receiving apparatus 901 are in proximity to each other, the power transmitting apparatus 101 and the power receiving apparatus 901 are brought away from each other.

The operations of PHASE4 in FIG. 10 will now be described. When the power transmitting apparatus 101 and the power receiving apparatus 901 are brought away from each other while the wireless power supply is in operation, the resultant arrangement state thereof makes it difficult for the power receiving apparatus 901 to receive power transmitted by the power transmitting apparatus 101; as a result, the received power, as well as the output voltage of the RX rectification smoothing circuit A 211, decreases.

Before the decreasing output voltage of the RX rectification smoothing circuit A 211 reaches VTG1CHG, which is the lower limit of the second control target voltage range, the RX control unit 202 reduces the charging current of the RX charge control circuit 282 by controlling the RX charge control circuit 282.

As the charging current of the RX charge control circuit 282 is reduced, the output voltage of the RX rectification smoothing circuit A 211 increases and reaches the second set voltage VLD2, which is the actuation voltage for the RX load driving circuit 273.

As the output voltage of the RX rectification smoothing circuit A 211 has reached the second set voltage VLD2, which is the actuation voltage, the RX load driving circuit 273 outputs current that drives the RX load circuit 272, and thus the load current flows through the RX load circuit 272. The charging current of the RX charge control circuit 282 has been temporarily suspended since the transition to PHASE4.

If the load current flowing through the RX load circuit 272 has been stable for the predetermined period (Tsta), the RX control unit 202 increases the charging current of the RX charge control circuit 282 by controlling the RX charge control circuit 282, and consequently, the load current flowing through the RX load circuit 272 is reduced.

The increase in the charging current of the RX charge control circuit 282 reduces the load current flowing through the RX load circuit 272. If the output voltage of the RX rectification smoothing circuit A 211 consequently becomes equal to or lower than the actuation voltage VLD2 for the RX load driving circuit 273, the output voltage of the RX rectification smoothing circuit A 211 decreases.

As a result of increasing the charging current of the RX charge control circuit 282, reducing the load current of the RX load circuit 272, and reducing the output voltage of the RX rectification smoothing circuit A 211 gradually in the foregoing manner, the load current of the RX load circuit 272 reaches zero.

Consequently, the voltage of the output portion of the RX rectification smoothing circuit A 211 falls within the second control target voltage range of VTG1CHG to VTG2CHG. A period for controlling the voltage to match the control target voltage after the predetermined period Tsta is expressed as Tadj.

The operations of PHASE4 are performed when the power transmitting apparatus 101 and the power receiving apparatus 901 enter into an arrangement state that further reduces the power supply efficiency. The operations of PHASE4 can be implemented as other operations. For example, the operations similar to PHASE4 can be implemented also when power transmitted from the power transmitting apparatus 101 has been reduced without changing the arrangement of the power transmitting apparatus 101 and the power receiving apparatus 901.

As described above, the present embodiment can not only achieve the advantageous effects of the first embodiment, but also improve the power supply efficiency and reduce the cost of the power receiving apparatus 901 by eliminating a constant voltage circuit interposed between a wireless power receiving terminal and a charging circuit compared with the first embodiment.

Third Embodiment

A third embodiment will now be described using FIGS. 11A, 11B and 12.

In the first embodiment, wireless communication and wireless power transmission/reception are performed between the power transmitting apparatus 101 and the power receiving apparatus 201, and when the voltage of the output unit of the circuit that rectifies and smoothes wireless power in the power receiving apparatus 201 has increased or fluctuated, processing for stabilizing the voltage of the output unit is executed.

In the second embodiment, when the voltage of the output unit of the circuit that rectifies and smoothes wireless power in the power receiving apparatus 901 has increased or fluctuated, processing for stabilizing the voltage of the output unit is executed; note that the power receiving apparatus 901 is the same as the power receiving apparatus 201 according to the first embodiment, except that it does not include the RX constant voltage circuit A 281.

The third embodiment pertains to an example in which, when the voltage of the output unit of the circuit that rectifies and smoothes wireless power in the power receiving apparatus 201 or 901 has increased or fluctuated, a circuit that is different from the circuits according to the first and second embodiments is used as a unit that suppresses the voltage fluctuation of the output unit.

As the wireless power supply operation according to the present embodiment is similar to the flowcharts of FIGS. 4A and 4B according to the first embodiment, a description thereof will be omitted. The present embodiment can adopt either the configuration of the power receiving apparatus 201 shown in FIG. 2 according to the first embodiment or the configuration of the power receiving apparatus 901 shown in FIG. 9 according to the second embodiment.

The present embodiment differs from the first and second embodiments in a flowchart of step S450 of FIG. 4B, which is related to control over the output voltage of the rectification smoothing circuit of the power receiving apparatus, and in the exemplary circuit configurations of the RX overvoltage protection circuit 271, the RX load circuit 272, and the RX load driving circuit 273 that are intended to perform such control.

Figure 11A:
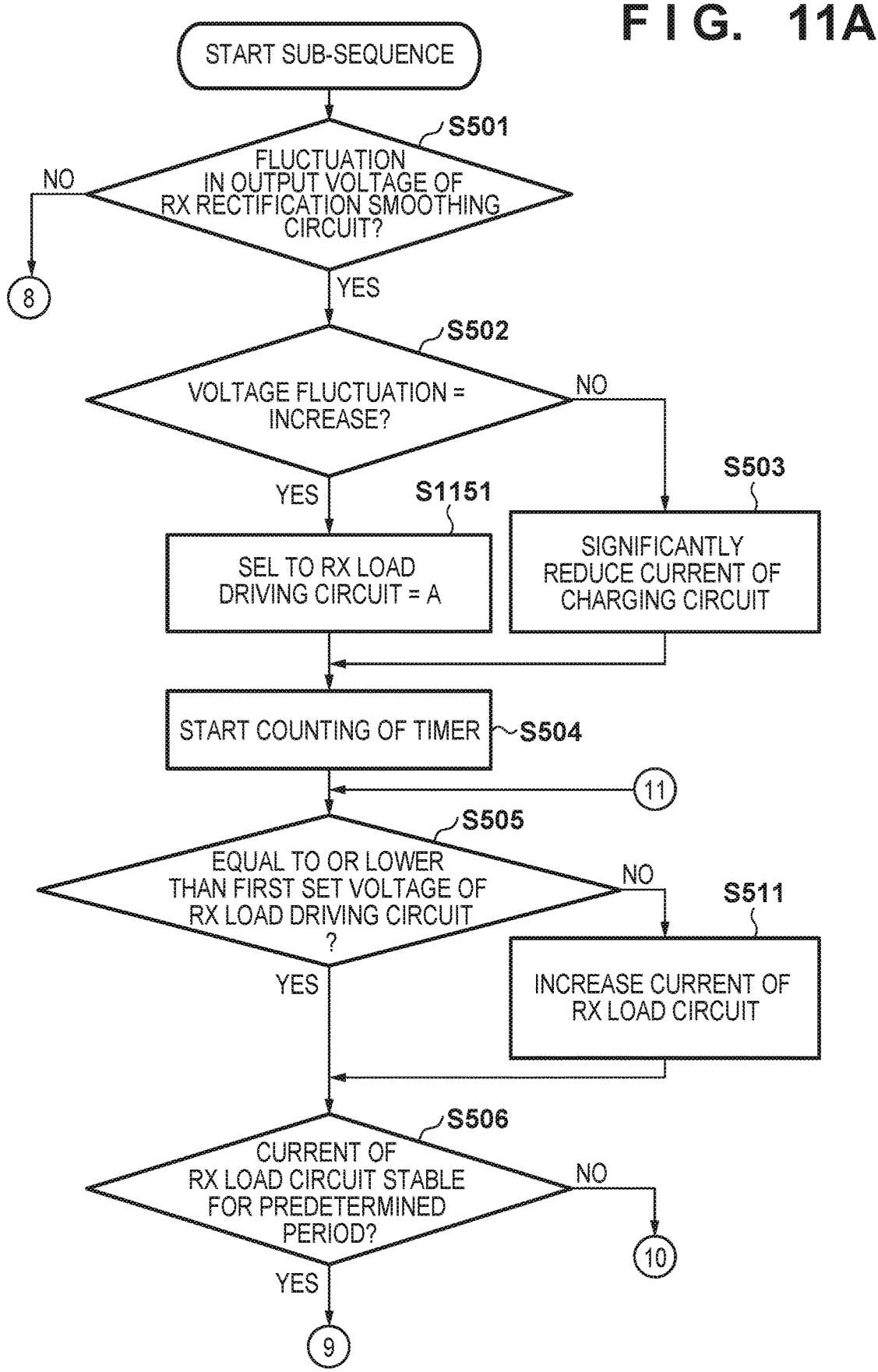
FIGS. 11A and 11B are flowcharts of control over the output voltage of a rectification smoothing circuit of a power receiving apparatus according to a third embodiment.
Figure 11B:
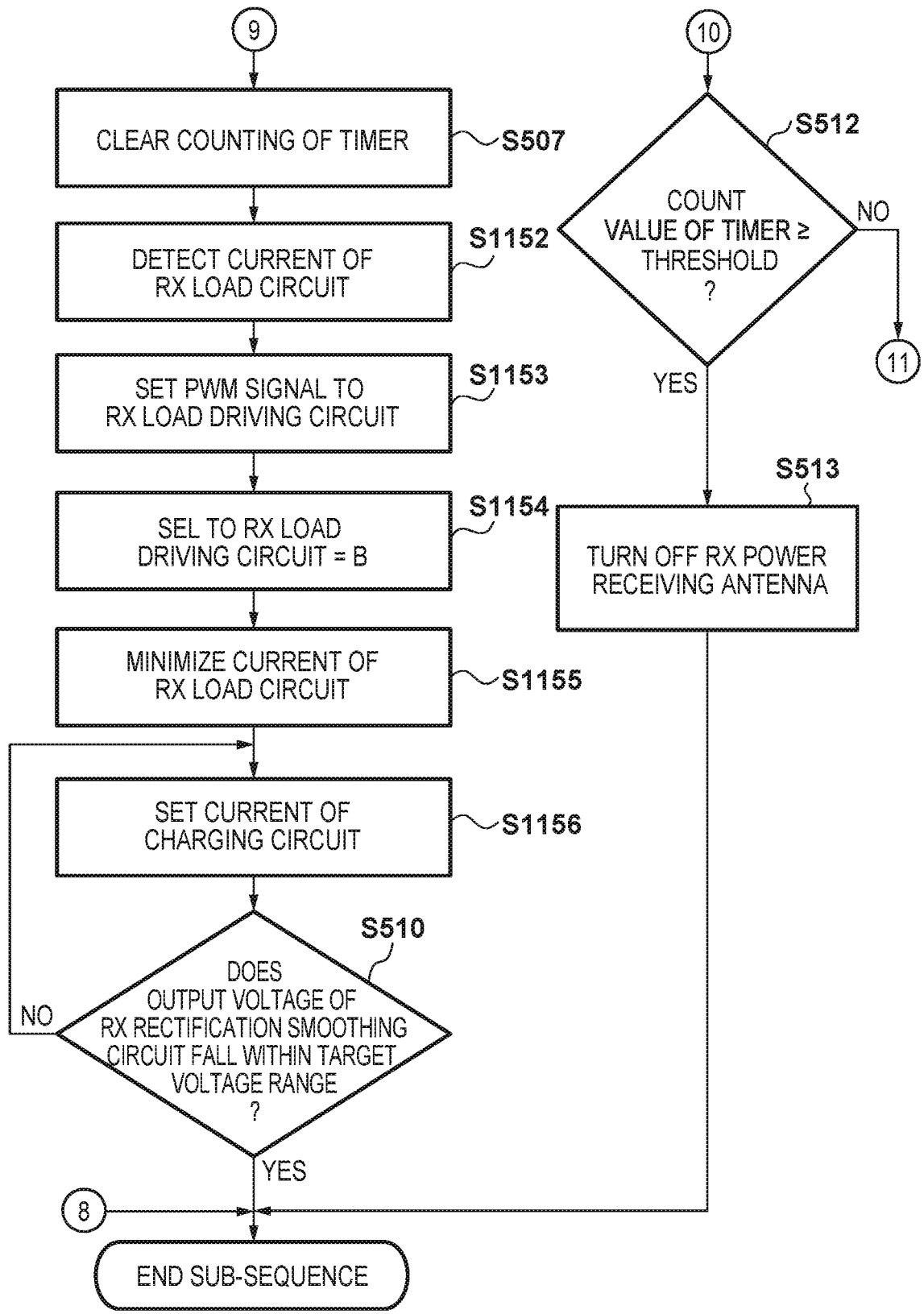

Using FIGS. 11A and 11B, the following describes processing of the power receiving sub-sequence in step S450 of FIG. 4B, which is intended to stabilize the transient-state voltage of the output portion of the RX rectification smoothing circuit A 211 in the power receiving apparatus 201 during the wireless power supply according to the present embodiment.

First, the exemplary circuit configurations of the RX overvoltage protection circuit 271, the RX load circuit 272, and the RX load driving circuit 273 according to the present embodiment will be described using FIG. 12.

Figure 12:
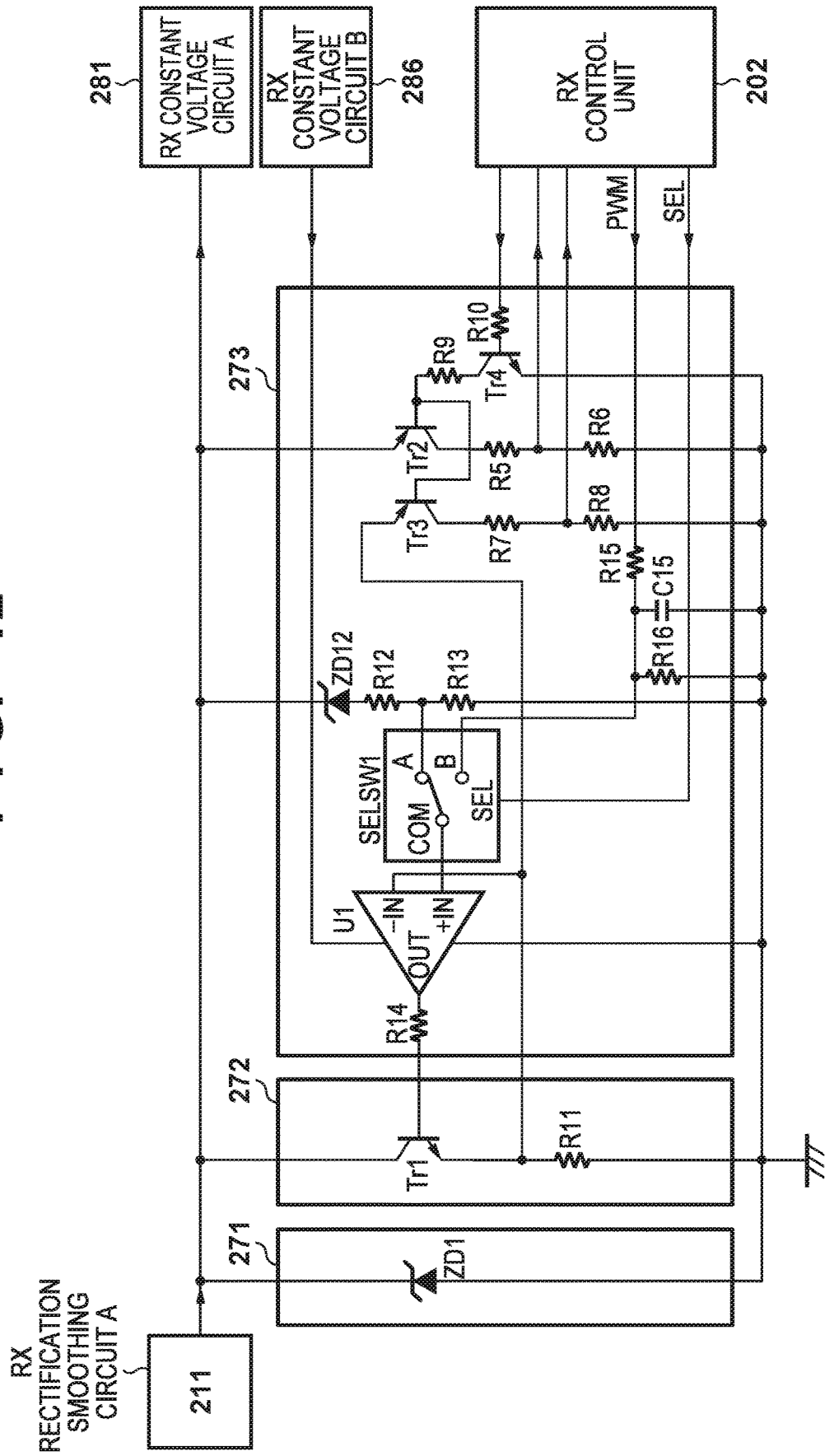
FIG. 12 shows an exemplary configuration of a load circuit of the power receiving apparatus according to the third embodiment.

In FIG. 12, the RX overvoltage protection circuit 271 is comprised of a constant voltage diode ZD1. The RX load circuit 272 is comprised of a transistor Tr1 and a resistor R11 that is connected to the emitter side of the transistor Tr1. The RX load driving circuit 273 is comprised of a constant voltage diode ZD12, resistors R13, R14, R5, R6, R7, R8, R9, R10, R15, and R16, a capacitor C15, transistors Tr2, Tr3, and Tr4, a selector switch SELSW1, and an operational amplifier U1.

The selector switch SELSW1 can select an A terminal or a B terminal as a terminal to be connected to COM under control of the RX control unit 202. The selector switch SELSW1 may be, for example, a semiconductor analog switch, a transistor, a MEMS switch, or any element that can compose a circuit that can perform a switching operation in accordance with a control signal.

In FIG. 12, the illustration of a bypass capacitor that is not necessary for the description of the present embodiment is omitted. Furthermore, a specific description of the blocks and operations that are not necessary for the description of the present embodiment will be omitted below. In FIG. 12, upon wireless reception of power via the RX power receiving antenna A 213, the RX rectification smoothing circuit A 211 outputs DC voltage.

As the output from the RX rectification smoothing circuit A 211 is input to the RX constant voltage circuit B 286, upon wireless reception of power via the RX power receiving antenna A 213, the RX constant voltage circuit B 286 outputs constant voltage, and the operational amplifier U1 starts operating using the voltage of the RX constant voltage circuit B 286 as an operating power source.

Connection to the A terminal is established in the selector switch SELSW1 of the RX load driving circuit 273 in an initial state. When the voltage of the output portion of the RX rectification smoothing circuit A 211 has exceeded the breakdown voltage of the constant voltage diode ZD12, the diode ZD12 starts operating, and voltage is applied to a +IN terminal of the operational amplifier U1.

When voltage is applied to the +IN terminal, the operational amplifier U1 constitutes a voltage follower circuit, and outputs the voltage that is equal to the voltage applied to the +IN terminal of the operational amplifier U1 to an OUT terminal.

The output from the OUT terminal of the operational amplifier U1 drives the transistor Tr1 of the RX load circuit 272. The voltage of the resistor 11, which is interposed between an emitter of the transistor Tr1 of the RX load circuit 272 and the ground, is connected to a −IN terminal of the operational amplifier U1, thereby composing a constant current circuit that controls current flowing through the transistor Tr1 in accordance with the voltage of the OUT terminal of the operational amplifier U1.

When driven, the transistor Tr1 of the RX load circuit 272 causes current to flow from the output portion of the RX rectification smoothing circuit A 211 to the ground via the resistor R11.

Along with this flow of current in the driven RX load circuit 272, the voltage of the output portion of the RX rectification smoothing circuit A 211 decreases and falls below the breakdown voltage of the constant voltage diode ZD12, thereby reducing the output current of the OUT terminal of the operational amplifier U1, and suspending the driving of the transistor Tr1 of the RX load circuit 272.

As described above, in the initial state of the selector switch SELSW1 in which connection to the A terminal is established, the RX load circuit 272 and the RX load driving circuit 273 operate in accordance with the breakdown voltage of the constant voltage diode ZD12. This can suppress and stabilize a transient voltage increase of the output portion of the RX rectification smoothing circuit A 211.

The current of the RX load circuit 272 and the voltage of the output portion of the RX rectification smoothing circuit A 211 can be measured as values of voltages that have been divided using resistors by driving the transistors Tr4, Tr2, and Tr3 of the RX load driving circuit 273 in accordance with a control signal from the RX control unit 202.

A description is now given of the operations performed by the RX control unit 202 to control the RX load circuit 272 and the RX load driving circuit 273.

In order to control the RX load circuit 272 and the RX load driving circuit 273, the RX control unit 202 switches to the B terminal of the selector switch SELSW1 using a SEL signal of the RX control unit 202. Then, the voltage applied to the +IN terminal of the operational amplifier U1 is controlled using a PWM signal from the RX control unit 202.

The selector switch SELSW1 of the RX load driving circuit 273 can perform switching control so that connection to the A terminal is established when the SEL signal from the RX control unit 202 is at L, and connection to the B terminal is established when the SEL signal from the RX control unit 202 is at H.

The RX control unit 202 switches to the B terminal of the selector switch SELSW1 using the SEL signal, and outputs the PWM signal to the B terminal of the selector switch SELSW1. For example, the PWM signal from the RX control unit 202 is a pulse sequence with a duty cycle, smoothed by a low-pass filter comprised of the resistor R15 and the capacitor C15, and capable of performing control to apply an arbitrary DC voltage to the +IN terminal of the operational amplifier U1. That is to say, when connection to the B terminal is established in the selector switch SELSW1, the RX load circuit 272 and the RX load driving circuit 273 operate under control of the PWM signal from the RX control unit 202.

When the RX control unit 202 controls the RX load circuit 272 and the RX load driving circuit 273, a control target voltage range is set for the voltage of the output portion of the RX rectification smoothing circuit A 211. It is sufficient to drive the RX load circuit 272 and adjust current by controlling the PWM signal from the RX control unit 202 so that the voltage of the output portion of the RX rectification smoothing circuit A 211 falls within the control target voltage range.

When the RX control unit 202 controls the RX load circuit 272 and the RX load driving circuit 273, the RX control unit 202 also controls the charging current from the RX charge control circuit 282 to the RX battery 203 at the same time. Furthermore, it performs an operation to stabilize the voltage of the output portion of the RX rectification smoothing circuit A 211 by adjusting the current to flow through the RX load circuit 272 and the current to flow through the RX charge control circuit 282 so that the voltage of the output portion of the RX rectification smoothing circuit A 211 falls within the control target voltage range.

Using FIGS. 11A and 11B, the following describes processing of the power receiving sub-sequence in step S450 of FIG. 4B, which is intended to stabilize the transient-state voltage of the output portion of the RX rectification smoothing circuit A 211 in the power receiving apparatus during the wireless power supply according to the present embodiment.

As flowcharts of FIGS. 11A and 11B additionally includes the processes of steps S1151 to S1156 compared with the flowchart of FIG. 5 according to the first and second embodiments, the processes that are the same as the processes in FIG. 5 are given the same reference signs thereas to omit a description thereof, and the following description focuses on the differences.

If the RX control unit 202 of the power receiving apparatus 201 determines that the fluctuation in the output voltage of the RX rectification smoothing circuit A 211 is an increase in step S502, the processing proceeds to step S1151.

In step S1151, the RX control unit 202 of the power receiving apparatus 201 switches to the A terminal of the selector switch SELSW1 of the RX load driving circuit 273, and then the processing proceeds to step S504.

If the RX control unit 202 of the power receiving apparatus 201 determines that the current of the RX load circuit 272 has been stable for the predetermined period in step S506, the processing proceeds to step S507, and counting of the timer that started in step S504 is cleared.

After counting of the timer has been cleared in step S507, the processing proceeds to step S1152 in which the RX control unit 202 of the power receiving apparatus 201 detects the load current of the RX load circuit 272. In detecting the load current of the RX load circuit 272 in step S1152, a value of voltage that has been divided using resistors by driving the transistors Tr4 and Tr3 of the RX load driving circuit 273 in accordance with a control signal from the RX control unit 202 can be measured and converted into a current value.

In step S1153, the RX control unit 202 of the power receiving apparatus 201 sets a PWM control signal to the RX load driving circuit 273 so as to enable a flow of current that is equal to the current value of the RX load circuit 272 obtained in step S1152.

In step S1154, the RX control unit 202 of the power receiving apparatus 201 switches to the B terminal of the selector switch SELSW1 of the RX load driving circuit 273, and then the processing proceeds to step S1155.

Regarding control over the RX load circuit 272 and the RX load driving circuit 273, step S1154 makes a switch from a passive operation based on the output voltage of the RX rectification smoothing circuit A 211 to an active operation based on control performed by the RX control unit 202.

In step S1155, the RX control unit 202 of the power receiving apparatus 201 sets the PWM control signal to the RX load driving circuit 273 to the minimum, and sets the current value of the RX load circuit 272 to the minimum.

In step S1156, the RX control unit 202 of the power receiving apparatus 201 sets the charging current supplied from the RX charge control circuit 282 to the RX battery 203, almost simultaneously with step S1155. It will be assumed that the charging current value set in step S1156 is a sum of a charging current value that was previously set and the current value equal to the current of the RX load circuit 272, which was set in step S1153.

Thereafter, in step S510, the RX control unit 202 of the power receiving apparatus 201 determines whether the output voltage of the RX rectification smoothing circuit A 211 falls within the first control target voltage range or the second control target voltage range.

If the RX control unit 202 of the power receiving apparatus 201 determines that the output voltage of the RX rectification smoothing circuit A 211 falls within the first control target voltage range or the second control target voltage range in step S510, the processing ends.

If the RX control unit 202 of the power receiving apparatus 201 determines that the output voltage of the RX rectification smoothing circuit A 211 does not fall within the first control target voltage range or the second control target voltage range in step S510, the processing returns to step S1156.

Thereafter, the processes of steps S1156 and S510 are repeated until the output voltage of the RX rectification smoothing circuit A 211 falls within the first control target voltage range or the second control target voltage range, and the charging current value of the RX charge control circuit 282 is gradually increased.

As described above, the present embodiment can not only achieve the advantageous effects of the first and second embodiments, but also control a circuit intended to charge the battery using the charging current that is optimal for power wirelessly received by the power receiving apparatus while switching between a passive operation based on the voltage generated in a circuit and an active operation performed by a control unit.

Furthermore, compared with the first and second embodiments, the present embodiment can quickly set the charging current that is optimal for power wirelessly received by the power receiving apparatus through the passive operation performed by the control unit.

Other Embodiments

In the foregoing first to third embodiments, wireless communication units that control wireless power transmission/reception perform communication using, for example, Bluetooth Low Energy®, which is a short-range wireless communication standard. However, wireless communication that can be used in the present embodiments is not limited to Bluetooth Low Energy®. For example, IEEE 802.11 and IEEE 802.15.1, which are a WLAN standard and a short-range wireless standard respectively, may be used. In performing communication compliant with these communication standards, the TX communication unit C 131 of the power transmitting apparatus 101 and the RX communication unit C 231 of the power receiving apparatus 201 have communication functions compliant with these communication standards.

Furthermore, in the present embodiments, wireless communication may be performed using, for example, protocols of JISX 6319-4, ISO/IEC 21481, ISO/IEC 14443, and ISO/IEC 15693, which are near field wireless communication standards. In performing communication compliant with these communication standards, the TX communication unit B 121 of the power transmitting apparatus 101 has the functions of a non-contact IC reader/writer, and the RX communication unit B 221 of the power receiving apparatus 201 or 901 has the functions of a non-contact IC.

In performing wireless communication using protocols of a near field wireless communication standard at a power frequency of 13.56 MHz in wireless power supply, a period of wireless communication for controlling wireless power transmission/reception and a period of wireless power transmission/reception are determined based on a time-division scheme. For example, the allocation of the period of wireless communication for controlling wireless power transmission/reception and the period of wireless power transmission/reception may be determined in advance through wireless communication between the power transmitting apparatus and the power receiving apparatus.

The foregoing present embodiments have introduced a configuration in which, to establish connection for wireless communication for controlling wireless power transmission/reception, the power receiving apparatus transmits a polling signal, and the power transmitting apparatus that has received the polling signal transmits a connection request. However, wireless communication that can be used in the present embodiments is not limited in this way. For example, the present embodiments may adopt a configuration in which the power transmitting apparatus 101 transmits a polling signal, and the power receiving apparatus 201 or 901 that has received the polling signal transmits a connection request.

That is to say, in the present embodiments, the wireless communication units that control wireless power transmission/reception may be of any type as long as wireless communication and wireless power transmission/reception are performed between the power transmitting apparatus 101 and the power receiving apparatus 201 or 901.

The foregoing first to third embodiments pertain to an example in which the resonant frequency of the TX power transmitting antenna A 113 of the power transmitting apparatus 101 and the RX power receiving antenna A 213 of the power receiving apparatus 201 or 901 is around 6.78 MHz in the HF band. However, the resonant frequency of the TX power transmitting antenna A 113 and the RX power receiving antenna A 213 that can be used in the present embodiments is not limited to being around 6.78 MHz in the HF band. For example, as long as power can be wirelessly transmitted and received between the power transmitting apparatus 101 and the power receiving apparatus 201 or 901, the resonant frequency of the TX power transmitting antenna A 113 and the RX power receiving antenna A 213 may be 13.56 MHz in the same HF band, or may be in another frequency band.

The foregoing first to third embodiments pertain to an example in which each of the TX power transmitting antenna A 113 and the TX communication antenna B 123 of the power transmitting apparatus 101 is configured as an independent antenna. However, each of the TX power transmitting antenna A 113 and the TX communication antenna B 123 of the power transmitting apparatus that can be used in the present embodiments is not limited to being configured as an independent antenna. For example, the antenna functions of the TX power transmitting antenna A 113 and the TX communication antenna B 123 may be integrated into a single antenna. In this case, the TX power transmitting unit A 111 and the TX communication unit B 121 of the power transmitting apparatus realize the functions of wireless power transmission and wireless communication using the single antenna.

When the TX power transmitting antenna A 113 and the TX communication antenna B 123 are integrated into the single antenna, power transmission and wireless communication may each be performed exclusively by the TX power transmitting unit A 111 and the TX communication unit B 121, respectively, so that they do not affect each other's functions, and a protection circuit may be provided in the single antenna.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-214640, filed Nov. 1, 2016 which is hereby incorporated by reference herein in its entirety.

What is claimed is:

1. A communication apparatus comprising:
a memory and at least one processor and/or at least one circuit allowing the apparatus to perform the operations of the following units:
a power receiving unit configured to be capable of wirelessly receiving power from another apparatus;
a charging unit configured to be capable of charging a secondary battery using the power received from the another apparatus;
a wireless communication unit configured to be capable of performing wireless communication with the another apparatus;
a rectification smoothing unit configured to rectify and smooth the power received from the another apparatus, and to output the rectified and smoothed power;
a suppressing unit configured to suppress a transient voltage fluctuation in an output voltage of the rectification smoothing unit; and
a driving unit configured to drive the suppressing unit so that the output voltage of the rectification smoothing unit generated by the power received from the another apparatus does not exceed a first voltage; and
a control unit configured to control the power receiving unit, the charging unit, and the wireless communication unit,
wherein, when an operation to drive the suppressing unit so that the output voltage of the rectification smoothing unit does not exceed the first voltage has continued for a predetermined period or longer, the control unit controls the power receiving unit so as not to receive the power from the another apparatus.

2. The apparatus according to claim 1, wherein until the output voltage of the rectification smoothing unit reaches a voltage that does not exceed the first voltage, the control unit gradually increases charging current of the charging unit that is intended to charge the secondary battery using the power received from the another apparatus, and
wherein until the output voltage of the rectification smoothing unit falls within a range of a second voltage to a third voltage that are lower than the first voltage, the control unit further gradually increases the charging current of the charging unit.

3. The apparatus according to claim 2, wherein the suppressing unit includes a load unit configured to pull out load current from the rectification smoothing unit, wherein the driving unit includes a load current detection unit configured to detect the load current flowing through the load unit, wherein the control unit increases the charging current of the charging unit that is intended to charge the secondary battery using the power received from the another apparatus, so as to make the charging current of the charging unit equal to the load current detected by the load current detection unit, and wherein until the output voltage of the rectification smoothing unit falls within the range of the second voltage to the third voltage, the control unit further gradually increases the charging current of the charging unit.

4. The apparatus according to claim 3, wherein when the load current of the load unit has been stable for a predetermined period, the control unit starts control to gradually increase the charging current of the charging unit.

5. The apparatus according to claim 4, wherein when the load current of the load unit is not stable after elapse of the predetermined period or longer, the control unit does not start the control to gradually increase the charging current of the charging unit.

6. The apparatus according to claim 2, wherein the first voltage is lower than an absolute maximum rated voltage of the charging unit, the second voltage is equal to or higher than an operable voltage of the charging unit, and the third voltage is lower than the operable voltage of the charging unit.

7. The apparatus according to claim 6, wherein an overvoltage protection unit is provided at an output portion of the rectification smoothing unit and in a preceding stage of the suppressing unit, and wherein a protection voltage of the overvoltage protection unit is lower than the absolute maximum rated voltage of the charging unit.

8. The apparatus according to claim 2, wherein a first constant voltage unit which outputs a first constant voltage is provided between the rectification smoothing unit and the charging unit, and wherein the first voltage is lower than an absolute maximum rated voltage of the first constant voltage unit, the second voltage is equal to or higher than an operable voltage of the first constant voltage unit, and the third voltage is lower than the operable voltage of the first constant voltage unit.

9. The apparatus according to claim 8, wherein an overvoltage protection unit is provided at an output portion of the rectification smoothing unit and in a preceding stage of the suppressing unit, and wherein a protection voltage of the overvoltage protection unit is lower than the absolute maximum rated voltage of the first constant voltage unit.

10. The apparatus according to claim 8, wherein a second constant voltage unit which outputs a second constant voltage is provided at an output portion of the rectification smoothing unit, wherein the second constant voltage unit serves as a power source that enables the control unit to operate the charging unit, the wireless communication unit, and the driving unit, wherein an absolute maximum rated voltage of the second constant voltage unit is higher than operable voltages of other units connected to the output portion of the rectification smoothing unit, and wherein an operable voltage range of the second constant voltage unit is wider than voltage ranges of the other units connected to the output portion of the rectification smoothing unit.

11. The apparatus according to claim 10, further comprising a display unit configured to display an operation state of the apparatus, wherein the second constant voltage unit serves as a power source for the control unit and the display unit, and wherein the control unit and the display unit continue to operate when the output voltage of the rectification smoothing unit is lower than an operable voltage of the charging unit and the operable voltage of the first constant voltage unit and is equal to or higher than an operable voltage of the second constant voltage unit.

12. The apparatus according to claim 1, wherein, when the fluctuation in the output voltage of the rectification smoothing unit is a decrease, the control unit causes charging current of the charging unit to decrease.

13. The apparatus according to claim 1, wherein the driving unit has a switch unit configured to switch to one of a first operation based on the output voltage of the rectification smoothing unit and a second operation performed by the control unit.

14. A control method of a communication apparatus which has a memory and at least one processor and/or at least one circuit to perform the operations of a power receiving unit configured to be capable of wirelessly receiving power from another apparatus, a charging unit configured to be capable of charging a secondary battery using the power received from the another apparatus, a wireless communication unit configured to be capable of performing wireless communication with the another apparatus, a rectification smoothing unit configured to rectify and smooth the power received from the another apparatus and output the rectified and smoothed power, a suppressing unit configured to suppress a transient voltage fluctuation in an output voltage of the rectification smoothing unit, and a driving unit configured to drive the suppressing unit so that the output voltage of the rectification smoothing unit generated by the power received from the another apparatus does not exceed a first voltage, and a control unit configured to control the power receiving unit, the charging unit, and the wireless communication unit, the method comprising:

until the output voltage of the rectification smoothing unit reaches a voltage that does not exceed the first voltage, gradually increasing charging current of the charging unit that is intended to charge the secondary battery using the power received from the another apparatus; and until the output voltage of the rectification smoothing unit falls within a range of a second voltage to a third voltage that are lower than the first voltage, further gradually increasing the charging current of the charging unit, wherein, when an operation to drive the suppressing unit so that the output voltage of the rectification smoothing unit does not exceed the first voltage has continued for a predetermined period or longer, the control unit controls the power receiving unit so as not to receive the power from the another apparatus.

15. A non-transitory computer-readable storage medium storing a program for causing a computer to execute a control method of a communication apparatus which has a power receiving unit configured to be capable of wirelessly receiving power from another apparatus, a charging unit configured to be capable of charging a secondary battery using the power received from the another apparatus, a wireless communication unit configured to be capable of performing wireless communication with the another apparatus, a rectification smoothing unit configured to rectify and smooth the power received from the another apparatus and output the rectified and smoothed power, a suppressing unit configured to suppress a transient voltage fluctuation in an output voltage of the rectification smoothing unit, and a driving unit configured to drive the suppressing unit so that the output voltage of the rectification smoothing unit generated by the power received from the another apparatus does not exceed a first voltage, and a control unit configured to control the power receiving unit, the charging unit, and the wireless communication unit, the method comprising:

until the output voltage of the rectification smoothing unit reaches a voltage that does not exceed the first voltage, gradually increasing charging current of the charging unit that is intended to charge the secondary battery using the power received from the another apparatus; and until the output voltage of the rectification smoothing unit falls within a range of a second voltage to a third voltage that are lower than the first voltage, further gradually increasing the charging current of the charging unit, wherein, when an operation to drive the suppressing unit so that the output voltage of the rectification smoothing unit does not exceed the first voltage has continued for a predetermined period or longer, the control unit controls the power receiving unit so as not to receive the power from the another apparatus.

* * * * *